US007137137B2

(12) United States Patent
Hayasaka et al.

(10) Patent No.: US 7,137,137 B2
(45) Date of Patent: Nov. 14, 2006

(54) COMPOSITE MEDIA FILE BROADCASTING PROGRAM BROADCASTING CONTROL SYSTEM

(75) Inventors: Rina Hayasaka, Tokyo (JP); Masahiro Tabuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 1092 days.

(21) Appl. No.: 09/840,121

(22) Filed: Apr. 24, 2001

(65) Prior Publication Data
US 2002/0032910 A1    Mar. 14, 2002

(30) Foreign Application Priority Data
Apr. 25, 2000 (JP) .............................. 2000-123449
Nov. 20, 2000 (JP) .............................. 2000-353403

(51) Int. Cl.
G06F 3/00 (2006.01)

(52) U.S. Cl. ......................................... 725/54; 725/116
(58) Field of Classification Search ................. 725/50, 725/54, 114–116, 144–146
See application file for complete search history.

(56) References Cited

U.S. PATENT DOCUMENTS

| | | | | |
|---|---|---|---|---|
| 4,814,883 | A * | 3/1989 | Perine et al. ................. | 725/36 |
| 5,424,770 | A * | 6/1995 | Schmelzer et al. ........... | 725/36 |
| 6,198,906 | B1 * | 3/2001 | Boetje et al. ............... | 455/3.01 |
| 6,209,131 | B1 * | 3/2001 | Kim et al. .................... | 725/50 |
| 2003/0217360 | A1 | 11/2003 | Gordon et al. | |

FOREIGN PATENT DOCUMENTS

| | | |
|---|---|---|
| JP | 4-364682 | 12/1992 |
| JP | 7-250036 | 9/1995 |
| JP | 9-018786 | 1/1997 |
| JP | 10-275180 | 10/1998 |
| JP | 10-285505 | 10/1998 |
| JP | 2000-115095 | 4/2000 |
| JP | 2000-115746 | 4/2000 |
| JP | 2003-524307 | 8/2003 |

OTHER PUBLICATIONS

Jerry Boetje et al., "A Common Information Structure for Broadcast Applications", Oct. 1997, pp. 682-697.
Ammeraal, Leendert, "Programs and Data Structures in C", © 1987 John Wiley & Sons, Ltd., 14 pages, (1987).
Hayasaka, et al., "A Broadcasting Schedule Management Method Supporting Real-time Change of Data Broadcasting Programs", pp. 571-576, (Jun. 2000).

* cited by examiner

*Primary Examiner*—Jeffery Hofsass
*Assistant Examiner*—Shirley Chang
(74) *Attorney, Agent, or Firm*—Foley & Lardner LLP

(57) ABSTRACT

An organizing unit manages a program frame and a time frame of CM and a producing unit generates a composite media file to be broadcasted and a broadcasting schedule information. A schedule control unit concentrically control an organized schedule information map managing the organizing unit, a composite media file modification schedule information map held by the producing unit and a file updating schedule information map. A broadcasting unit generates a broadcasting data according to the information provided by the schedule control unit to perform broadcasting to a transmission line. A trigger input device commands broadcasting unit for modification of the broadcasting data of the program on broadcasting.

6 Claims, 39 Drawing Sheets

FIG. 2
EACH ENTRY OF TIME OBJECT MAP
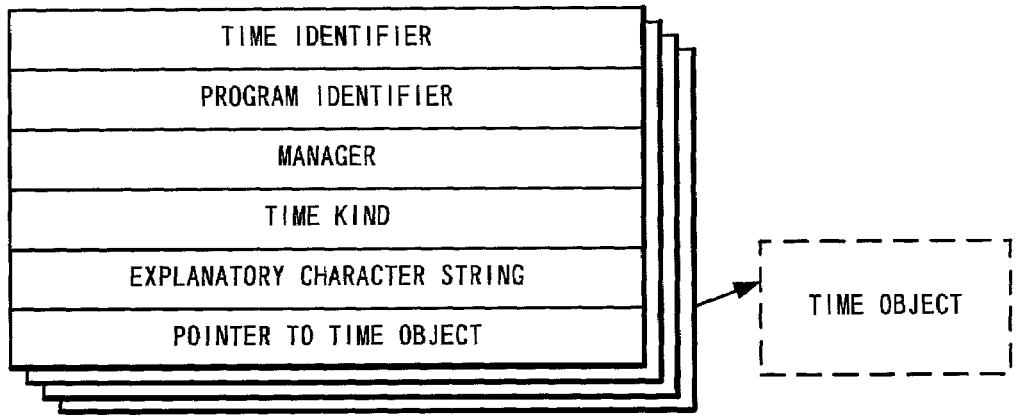
FIG. 3
TIME FIXED TYPE OBJECT
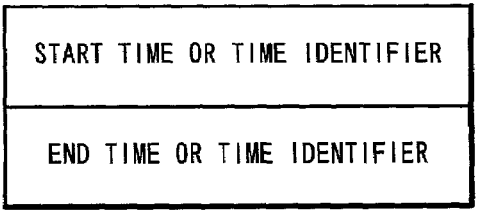
(b-1)
RANGE DESIGNATION TYPE TIME OBJECT
| START TIME OR TIME IDENTIFIER |
| END TIME OR TIME IDENTIFIER |
(b-2)
OFFSET DESIGNATION TYPE TIME OBJECT
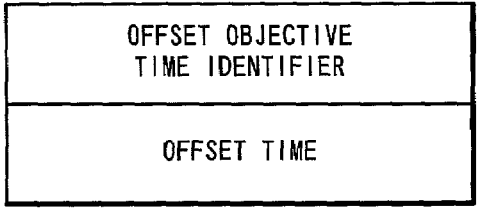
(b-3)

FIG. 5

PROGRAM INFORMATION

| BROADCASTING STATION IDENTIFIER |
| --- |
| PROGRAM START TIME |
| PROGRAM END TIME |
| PROGRAM TITLE |
| AUXILIARY INFORMATION |

FIG. 6

ORGANIZED SCHEDULE INFORMATION MAP

| BROADCASTING START TIMING | CONTINUING TIME | IDENTIFICATION NUMBER | KIND | UNTIME | TITLE | EXPLANATORY CHARACTER STRING |
| --- | --- | --- | --- | --- | --- | --- |
| 00/01/22 07:00:00 | 00:15:00 | 0100-0001 | PROGRAM | FIXED | QUIZ ABC | NO |
| 00/01/22 07:15:00 | 00:00:20 | 0200-0323 | CM | INSERT (1) | IROHA COSMETRICS | CM (IROHA AND SO ON) |
| 00/01/22 07:15:20 | 00:00:20 | 0200-0324 | CM | OFFSET | AIU MOTORS | NO |
| 00/01/22 07:15:40 | 00:00:20 | 0200-0325 | CM | OFFSET | XYZ FOODS | NO |
| 00/01/22 07:16:00 | 00:39:00 | 0100-0002 | PROGRAM | FIXED | QUIZ ABC-2 | NO |
| 00/01/22 07:55:00 | 00:05:00 | 0100-0024 | PROGRAM | FIXED | WEATHER REPORT | NO |

FIG. 7

PROGRAM INFORMATION STORED IN PROGRAM INFORMATION STORAGE PORTION

| PROGRAM IDENTIFIER | 33 |
|---|---|
| BROADCASTING STATION IDENTIFIER | 8 |
| PROGRAM START TIME | 00/01/22 07:00:00 |
| PROGRAM END TIME | 00/01/22 08:00:00 |
| PROGRAM TITLE | QUIZ ABC |
| AUXILIARY INFORMATION | HOST:○○ GUEST:□□ |

FIG. 8

DATA BROADCASTING SCHEDULE INFORMATION MAP (HIERARCHY 1) STORED IN BROADCASTING SCHEDULE INFORMATION MAP STORAGE PORTION

| PROGRAM IDENTIFIER | BROADCASTING START TIME (TIME IDENTIFIER) | CONTINUING TIME | IDENTIFICATION NUMBER | KIND | TITLE | POINTER TO LOWER INFORMATION MAP |
|---|---|---|---|---|---|---|
| 33 | Q-START | 00:15:00 | 0100-0001 | PROGRAM | QUIZ ABC | |
| 33 | CM-IROHA | 00:00:20 | 0200-0323 | CM | IROHA COSMETRICS | |
| 33 | CM-AIU | 00:00:20 | 0200-0324 | CM | AIU MOTORS | |
| 33 | CM-XYZ | 00:00:20 | 0200-0325 | CM | XYZ FOODS | |
| 33 | Q-Q2A | 00:39:00 | 0100-0002 | PROGRAM | QUIZ ABC-2 | |
| 33 | WEATHER | 00:05:00 | 0100-0024 | PROGRAM | WEATHER REPORT | |

FIG. 9

TIME OBJECT MAP IS STORED IN TIME INFORMATION STORAGE PORTION

| PROGRAM IDENTIFIER | TIME IDENTIFIER | MANAGER | KIND | EXPLANATORY CHARACTER STRING | POINTER TO TIME OBJECT |
|---|---|---|---|---|---|
| 33 | Q-START | ORGANIZING | FIXED | NO | ● |
| 33 | CM-IROHA | ORGANIZING | INSERT(1) | CM (IROHA AND SO ON) | ● |
| 33 | CM-AIU | ORGANIZING | OFFSET | NO | ● |
| 33 | CM-XYZ | ORGANIZING | OFFSET | NO | ● |
| 33 | Q-Q2A | ORGANIZING | FIXED | NO | ● |
| 33 | WEATHER | ORGANIZING | FIXED | NO | ● |

TIME FIXED TYPE TIME OBJECT

| PROGRAM RELATIVE TIME |
|---|
| 00:00:00 |

RANGE DESIGNATION TYPE TIME OBJECT

| START – END TIME |
|---|
| 00:14:50 – 00:15:10 |

OFFSET DESIGNATION TYPE TIME OBJECT

| OFFSET OBJECTIVE TIME IDENTIFIER | OFFSET TIME |
|---|---|
| CM-IROHA | 00:00:20 |

| OFFSET OBJECTIVE TIME IDENTIFIER | OFFSET TIME |
|---|---|
| CM-IROHA | 00:00:40 |

| PROGRAM RELATIVE TIME |
|---|
| 00:16:00 |

| PROGRAM RELATIVE TIME |
|---|
| 00:55:00 |

FIG. 10

COMPOSITE MEDIA FILE MODIFICATION SCHEDULE INFORMATION MAP CORRESPONDING TO SCHEDULE INFORMATION OF TIME IDENTIFIER "Q-START"

| BROADCASTING START TIME | CONTINUING TIME | PRODUCING IDENTIFICATION NUMBER | UNTIME | COMPOSITE MEDIA FILE NAME | EXPLANATORY CHARACTER STRING | COMPONENT FILE LIST |
|---|---|---|---|---|---|---|
| 00:00:00 | 00:01:00 | 0300-0001 | FIXED | openning | NO | startup.html,open.jpg,<br>title.txt |
| 00:01:00 | 00:04:00 | 0300-0002 | FIXED | introduction | NO | startup.html,intro.wav,<br>name.txt |
| 00:05:00 | 00:05:00 | 0300-0003 | INSERT (2) | Q1-question | Q1: QUESTION | startup.html,back.jpg,<br>button.jpg,button2.jpg |
| 00:10:00 | 00:03:00 | 0300-0004 | INSERT (2) | Q1-answer | Q1: ANSWER | startup.html,back2.jpg,<br>answer.txt |
| 00:13:00 | 00:02:00 | 0300-0005 | INSERT (2) | Q2-question | Q2: QUESTION | startup.html,back2.jpg,<br>button.jpg,button2.jpg |

FIG. 11

FILE UPDATING SCHEDULE INFORMATION MAP OF startup.html

| BROADCASTING START TIMING | UNTIME | EXPLANATORY CHARACTER STRING | DATA POSITION IN PRODUCED CONTENTS SERVER |
|---|---|---|---|
| 00:00:00 | FIXED | NO | URI://cserver/ch01/ev03/01/startup.html |

FIG. 12

FILE UPDATING SCHEDULE INFORMATION MAP OF back.jpg

| BROADCASTING START TIMING | UNTIME | EXPLANATORY CHARACTER STRING | DATA POSITION IN PRODUCED CONTENTS SERVER |
|---|---|---|---|
| 00:00:00 | FIXED | NO | URI://cserver/ch01/ev03/01/back.jpg |
| 00:02:00 | FIXED | NO | URI://cserver/ch01/ev03/03/back.jpg |

FIG. 13

FILE UPDATING SCHEDULE INFORMATION MAP OF button.jpg

| BROADCASTING START TIMING | UNTIME | EXPLANATORY CHARACTER STRING | DATA POSITION IN PRODUCED CONTENTS SERVER |
|---|---|---|---|
| 00:00:00 | FIXED | NO | URI://cserver/ch01/ev03/01/button.jpg |
| 00:01:00 | INSERT(2) | BUTTON CHANGE | URI://cserver/ch01/ev03/02/button.jpg |

FIG. 14

FILE UPDATING SCHEDULE INFORMATION MAP OF button2.jpg

| BROADCASTING START TIMING | UNTIME | EXPLANATORY CHARACTER STRING | DATA POSITION IN PRODUCED CONTENTS SERVER |
|---|---|---|---|
| 00:00:00 | FIXED | NO | URI://cserver/ch01/ev03/01/button2.jpg |
| 00:02:00 | FIXED | NO | URI://cserver/ch01/ev03/03/button2.jpg |

00:00:00 START CONDITION

00:01:00 UPDATING OF
BUTTON IMAGE (button.jpg)

00:02:00 UPDATING OF BACKGROUND
AND BUTTON (back.jpg AND button2.jpg)

FIG. 18

DATA BROADCASTING SCHEDULE INFORMATION MAP (HIERARCHY 2) REGISTERED CORRESPONDING TO Fig. 10

| PROGRAM IDENTIFIER | BROADCASTING START TIMING (TIME IDENTIFIER) | PRODUCTION IDENTIFICATION NUMBER | COMPOSITE FILE NAME | COMPONENT FILE NAME LIST | POINTER TO LOWER SCHEDULE INFORMATION MAP |
|---|---|---|---|---|---|
| 33 | Q-START | 0300-0001 | opening | startup.html<br>open.jpg<br>title.txt | → CORRESPONDING BROADCASTING SCHEDULE INFORMATION MAP OF HIERARCHY 3<br>→<br>→ |
| 33 | Q-INTRO | 0300-0002 | introduction | startup.html<br>intro.wav<br>name.txt | →<br>→<br>→ |
| 33 | Q-Q1Q | 0300-0003 | Q1-question | startup.html<br>back.jpg<br>button.jpg<br>button2.jpg | → MAP OF Fig. 20<br>→ MAP OF Fig. 20<br>→<br>→ |
| 33 | Q-Q1A | 0300-0004 | Q1-answer | startup.html<br>back2.jpg<br>answer.txt | →<br>→<br>→ |
| 33 | Q-Q2Q | 0300-0005 | Q2-question | startup.html<br>back2.jpg<br>button.jpg<br>button2.jpg | →<br>→<br>→<br>→ |

FIG.19

DATA BROADCASTING SCHEDULE INFORMATION MAP (HIERARCHY 1) STORED IN BROADCASTING SCHEDULE INFORMATION MAP STORAGE PORTION

| PROGRAM IDENTIFIER | BROADCASTING START TIMING (TIME IDENTIFIER) | CONTINUING TIME | IDENTIFICATION NUMBER | KIND | TITLE | POINTER TO LOWER SCHEDULE INFORMATION MAP |
|---|---|---|---|---|---|---|
| 33 | Q-START | 00:15:00 | 0100-0001 | PROGRAM | QUIZ ABC | ● → SCHEDULE INFORMATION MAP OF Fig. 18 |
| 33 | CM-IROHA | 00:00:20 | 0200-0323 | CM | IROHA COSMETICS | ● → SCHEDULE INFORMATION MAP OF Fig. 18 |
| 33 | CM-AIU | 00:00:20 | 0200-0324 | CM | AIU MOTORS | ● |
| 33 | CM-XYZ | 00:00:20 | 0200-0325 | CM | XYZ FOODS | ● |
| 33 | Q-Q2A | 00:39:00 | 0100-0002 | PROGRAM | QUIZ ABC-2 | ● |
| 33 | WEATHER | 00:05:00 | 0100-0024 | PROGRAM | WEATHER REPORT | ● |

FIG. 20

DATA BROADCASTING SCHEDULE INFORMATION MAP
CORRESPONDING TO Fig. 11(HIERARCHY 3)

| PROGRAM IDENTIFIER | BROADCASTING START TIMING (TIME IDENTIFIER) | DATA POSITION IN PRODUCED CONTENTS SERVER |
|---|---|---|
| 33 | Q-Q1Q | URI://cserver/ch01/ev03/01/startup.html |

FIG. 21

DATA BROADCASTING SCHEDULE INFORMATION MAP
CORRESPONDING TO Fig. 12(HIERARCHY 3)

| PROGRAM IDENTIFIER | BROADCASTING START TIMING (TIME IDENTIFIER) | DATA POSITION IN PRODUCED CONTENTS SERVER |
|---|---|---|
| 33 | Q-Q1Q | URI://cserver/ch01/ev03/01/back.jpg |
| 33 | Q-Q1Q-3 | URI://cserver/ch01/ev03/03/back.jpg |

FIG. 22

DATA BROADCASTING SCHEDULE INFORMATION MAP
CORRESPONDING TO Fig. 13 (HIERARCHY 3)

| PROGRAM IDENTIFIER | BROADCASTING START TIMING (TIME IDENTIFIER) | DATA POSITION IN PRODUCED CONTENTS SERVER |
|---|---|---|
| 33 | Q-Q1Q | URI://cserver/ch01/ev03/01/button.jpg |
| 33 | Q-Q1Q-2 | URI://cserver/ch01/ev03/03/button.jpg |

FIG. 23

DATA BROADCASTING SCHEDULE INFORMATION MAP
CORRESPONDING TO Fig. 14 (HIERARCHY 3)

| PROGRAM IDENTIFIER | BROADCASTING START TIMING (TIME IDENTIFIER) | DATA POSITION IN PRODUCED CONTENTS SERVER |
|---|---|---|
| 33 | Q-Q1Q | URI://cserver/ch01/ev03/01/button2.jpg |
| 33 | Q-Q1Q-3 | URI://cserver/ch01/ev03/03/button2.jpg |

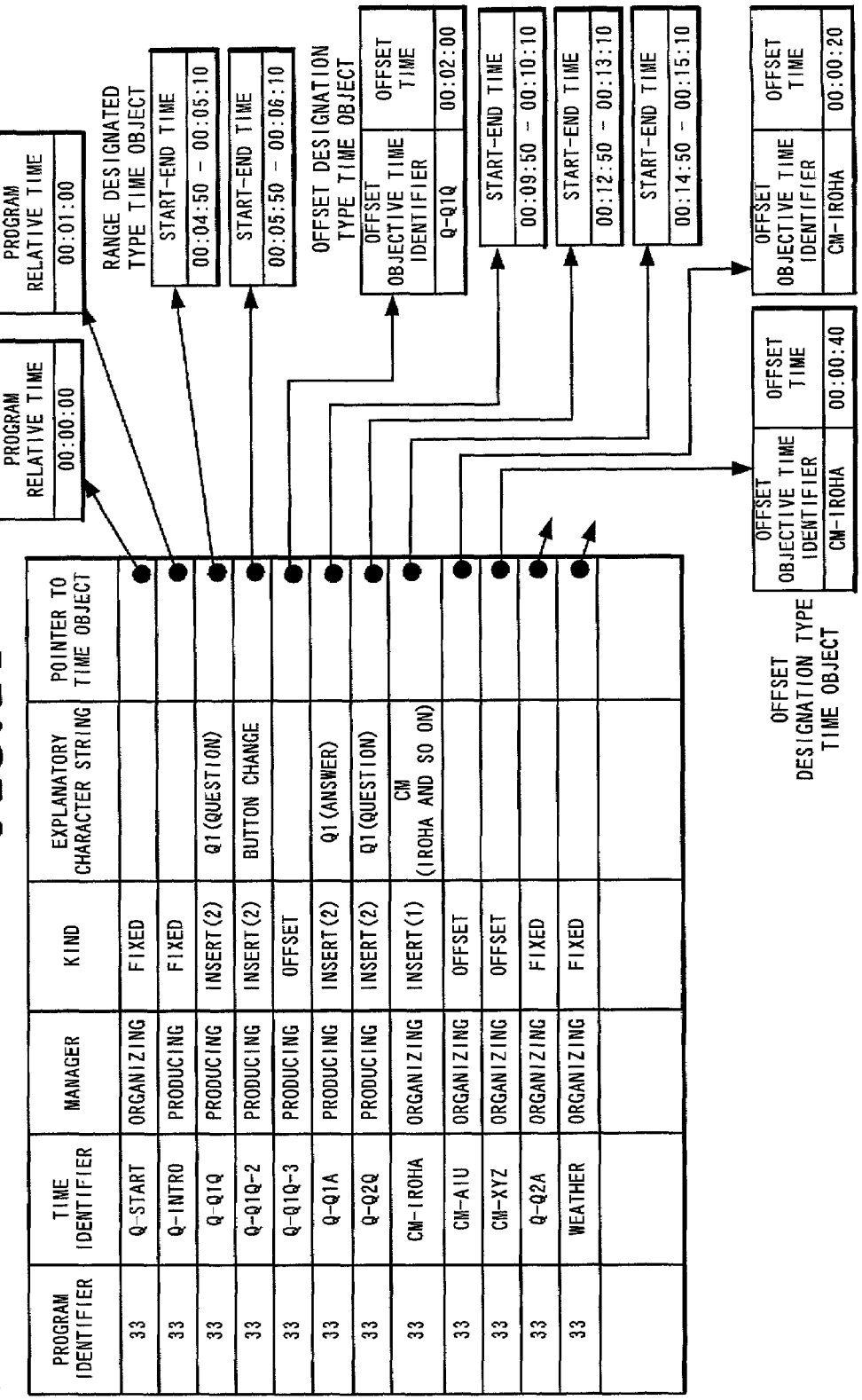

FIG. 26

UNITARY BROADCASTING SCHEDULE INFORMATION MAP GENERATED FOR BROADCASTING PREPARATORY PROCESS BY BROADCASTING UNIT IN FIRST EMBODIMENT OF THE PRESENT INVENTION

| TIME IDENTIFIER | IDENTIFICATION NUMBER | KIND | TITLE | COMPOSITE FILE NAME | PRODUCING IDENTIFICATION NUMBER | CONSTITUENT FILE | FILE POSITION |
|---|---|---|---|---|---|---|---|
| Q-START | 0100-0001 | PROGRAM | QUIZ ABC | opening | 0300-0001 | startup.html<br>open.jpg<br>title.txt | . . . |
| Q-INTRO | 0100-0001 | PROGRAM | QUIZ ABC | introduction | 0300-0002 | startup.html<br>intro.wav<br>name.txt | . . . |
| Q-Q1Q | 0100-0001 | PROGRAM | QUIZ ABC | Q1-question | 0300-0003 | startup.html<br>back.jpg<br>button.jpg<br>button2.jpg | URI://cserver/ch01/cv03/01/startup.html<br>URI://cserver/ch01/cv03/01/back.jpg<br>URI://cserver/ch01/ev03/01/button.jpg<br>URI://cserver/ch01/ev03/01/button2.jpg |
| Q-Q1Q-2 | 0100-0001 | PROGRAM | QUIZ ABC | Q1-question | 0300-0003 | startup.html<br>back.jpg<br>button.jpg<br>button2.jpg | URI://cserver/ch01/cv03/01/startup.html<br>URI://cserver/ch01/ev03/01/back.jpg<br>URI://cserver/ch01/ev03/02/button.jpg<br>URI://cserver/ch01/ev03/01/button2.jpg |
| Q-Q1Q-3 | 0100-0001 | PROGRAM | QUIZ ABC | Q1-question | 0300-0003 | startup.html<br>back.jpg<br>button.jpg<br>button2.jpg | URI://cserver/ch01/cv03/01/startup.html<br>URI://cserver/ch01/ev03/02/back.jpg<br>URI://cserver/ch01/ev03/02/button.jpg<br>URI://cserver/ch01/ev03/03/button2.jpg |
| Q-Q1A | 0100-0001 | PROGRAM | QUIZ ABC | Q1-answer | 0300-0004 | . . . . | . . . . |
| Q-Q2Q | 0100-0001 | PROGRAM | QUIZ ABC | Q2-question | 0300-0005 | . . . . | . . . . |
| CM-IROHA | 0200-0323 | CM | IROHA COSMETICS | CM-iroha | 0123-0001 | . . . . | . . . . |
| CM-AIU | 0200-0324 | CM | AIU MOTORS | CM-aiu | 0123-0002 | . . . . | . . . . |
| CM-XYZ | 0200-0325 | CM | XYZ FOODS | CM-xyz | 0123-0003 | . . . . | . . . . |
| CM-Q2A | 0100-0002 | PROGRAM | QUIZ ABC-2 | | | | |
| . . . | . . . . | . . . | . . . . | . . . . | . . . . | . . . . | . . . . |
| WEATHER | 0100-0024 | PROGRAM | WEATHER REPORT | | 0300-0200 | | |

FIG.27

TIME FIXED TYPE

| TIME IDENTIFIER | MANAGER | KIND | EXPLANATORY CHARACTER STRING | RELATIVE TIME |
|---|---|---|---|---|
| Q-START | ORGANIZING | FIXED | | 00:00:00 |
| Q-INTRO | PRODUCING | FIXED | | 00:01:00 |
| Q-Q2A | ORGANIZING | FIXED | | 00:16:00 |
| WEATHER | ORGANIZING | FIXED | | 00:55:00 |
| ... | ... | ... | | ... |

FIG.28

OFFSET DESIGNATION TYPE

| TIME IDENTIFIER | MANAGER | KIND | EXPLANATORY CHARACTER STRING | OBJECT | OFFSET VALUE |
|---|---|---|---|---|---|
| Q-Q1Q-3 | PRODUCING | OFFSET | | Q-Q1Q | 00:02:00 |
| CM-AIU | PRODUCING | OFFSET | | CM-IROHA | 00:00:20 |
| CM-XYZ | PRODUCING | OFFSET | | CM-IROHA | 00:00:40 |

FIG.29

RANGE DESIGNATION TYPE (TRIGGER INPUT DEVICE 151)

| TIME IDENTIFIER | MANAGER | KIND | EXPLANATORY CHARACTER STRING | INSERT TIME RANGE |
|---|---|---|---|---|
| CM-IROHA | ORGANIZING | INSERT(1) | CM (IROHA AND SO ON) | 00:14:50 - 00:15:10 |

FIG.30

RANGE DESIGNATION TYPE (TRIGGER INPUT DEVICE 152)

| TIME IDENTIFIER | MANAGER | KIND | EXPLANATORY CHARACTER STRING | INSERT TIME RANGE |
|---|---|---|---|---|
| Q-Q1Q | PRODUCING | INSERT(2) | Q1 (QUESTION) | 00:04:50 - 00:05:10 |
| Q-Q1Q-2 | PRODUCING | INSERT(2) | BUTTON CHANGE | 00:05:50 - 00:06:10 |
| Q-Q1A | PRODUCING | INSERT(2) | Q1 (ANSWER) | 00:09:50 - 00:10:10 |
| Q-Q2Q | PRODUCING | INSERT(2) | Q2 (QUESTION) | 00:12:50 - 00:13:10 |

FIG.31

| PROGRAM IDENTIFIER | 3 | CURRENT TIME | 00:01:34 |

| BROADCASTING TIME RANGE | EXPLANATION | |
|---|---|---|
| 00:14:50 - 00:15:10 | CM(IROHA AND SO ON) | BROADCASTING |
| 00:00:00 - 01:00:00 | CM(EMERGENCY) | BROADCASTING |
| 00:00:00 - 01:00:00 | CM(EMERGENCY 2) | BROADCASTING |

FIG. 33

| BROADCASTING START TIMING | CONTINUING TIME | IDENTIFICATION NUMBER | KIND | UNTIME | TITLE | EXPLANATORY CHARACTER STRING |
|---|---|---|---|---|---|---|
| 00/01/22 07:00:00 | 00:15:00 | 0100-0001 | PROGRAM | FIXED | QUIZ ABC | NO |
| 00/01/22 07:15:00 | 00:00:20 | 0200-0323 | CM | INSERT(1) | IROHA COSMETICS | CM (IROHA AND SO ON) |
| 00/01/22 07:15:20 | 00:00:20 | 0200-0324 | CM | OFFSET | AIU MOTORS | NO |
| 00/01/22 07:15:40 | 00:00:20 | 0200-0325 | CM | OFFSET | XYZ FOODS | NO |
| 00/01/22 07:16:00 | 00:39:00 | 0100-0002 | PROGRAM | FIXED | QUIZ ABC-2 | NO |
| 00/01/22 07:55:00 | 00:05:00 | 0100-0024 | PROGRAM | FIXED | WEATHER REPORT | NO |
| NOT DETERMINED | 00:00:30 | 0200-0400 | CM | INSERT(1) | BB BROADCASTING STATION | CM (EMERGENCY) |
| NOT DETERMINED | 00:00:30 | 0200-0500 | CM | INSERT(1) | EMERGENCY CM | CM (EMERGENCY 2) |

FIG. 34

COMPOSITE MEDIA FILE MODIFICATION SCHEDULE INFORMATION MAP CORRESPONDING TO FRAME OF "BB BROADCASTING STATION"

| BROADCASTING START TIMING | CONTINUING TIME | PRODUCING IDENTIFICATION NUMBER | UNTIME | COMPOSITE FILE NAME | EXPLANATORY CHARACTER STRING | CONSTITUENT FILE LIST |
|---|---|---|---|---|---|---|
| 00:00:00 | 00:00:30 | 0300-1000 | FIXED | bb-cm | | startup.html , back.jpg , intro.wav |

FIG.35

FILE UPDATING SCHEDULE INFORMATION MAP
OF startup.html OF bb-cm

| BROADCASTING START TIME | UNTIME | DATA POSITION IN PRODUCED CONTENTS SERVER |
|---|---|---|
| 00:00:00 | FIXED | URI://cserver/ch01/ev03/10/startup.html |

FIG.36

FILE UPDATING SCHEDULE INFORMATION MAP
OF back.jpg OF bbb-cm

| BROADCASTING START TIME | UNTIME | DATA POSITION IN PRODUCED CONTENTS SERVER |
|---|---|---|
| 00:00:00 | FIXED | URI://cserver/ch01/ev02/10/back.jpg |

FIG.37

FILE UPDATING SCHEDULE INFORMATION MAP
OF intro.wav OF bbb-cm

| BROADCASTING START TIME | UNTIME | DATA POSITION IN PRODUCED CONTENTS SERVER |
|---|---|---|
| 00:00:00 | FIXED | URI://cserver/ch01/ev02/10/intro.wav |
| 00:00:05 | FIXED | URI://cserver/ch01/ev02/11/intro.wav |

FIG.38

DATA BROADCASTING SCHEDULE INFORMATION MAP (HIERARCHY 1) CORRESPONDING TO Fig. 33

| PROGRAM IDENTIFIER | BROADCASTING START TIMING (TIME IDENTIFIER) | CONTINUING TIME | IDENTIFICATION NUMBER | KIND | TITLE | POINTER TO LOWER SCHEDULE INFORMATION MAP |
|---|---|---|---|---|---|---|
| 33 | Q-START | 00:15:00 | 0100-0001 | PROGRAM | QUIZ ABC | • ⋯ |
| 33 | CM-IROHA | 00:00:20 | 0200-0323 | CM | IROHA COSMETICS | • |
| 33 | CM-AIU | 00:00:20 | 0200-0324 | CM | AIU MOTORS | • |
| 33 | CM-XYZ | 00:00:20 | 0200-0325 | CM | XYZ FOODS | • |
| 33 | Q-Q2A | 00:39:00 | 0100-0002 | PROGRAM | QUIZ ABC-2 | • |
| 33 | WEATHER | 00:55:00 | 0100-0024 | PROGRAM | WEATHER REPORT | • |
| 33 | CM-BB | 00:00:30 | 0200-0400 | CM | BB BROADCASTING STATION | • → MAP OF FIG. 39 |
| 33 | CM-GOV | 00:00:30 | 0200-0500 | CM | CC BROADCASTING STATION CM | • |

FIG.39

DATA BROADCASTING SCHEDULE INFORMATION MAP (HIERARCHY 2) CORRESPONDING TO Fig.34

| PROGRAM IDENTIFIER | BROADCASTING START TIMING (TIME IDENTIFIER) | PRODUCING IDENTIFICATION NUMBER | COMPOSITE FILE NAME | CONSTITUENT FILE NAME LIST | POINT TO LOWER SCHEDULE INFORMATION MAP |
|---|---|---|---|---|---|
| 33 | CM-BB | 0300-1000 | bb-cm | startup.html | ● → MAP OF FIG.40 |
|  |  |  |  | back.jpg | ● → MAP OF FIG.41 |
|  |  |  |  | intro.wav | ● → MAP OF FIG.42 |

FIG.40

DATA BROADCASTING SCHEDULE INFORMATION MAP (HIERARCHY 3)
CORRESPONDING TO Fig. 35

| PROGRAM IDENTIFIER | RELATIVE TIME | DATA POSITION IN PRODUCED CONTENTS SERVER |
|---|---|---|
| 33 | CM-BB | URI://cserver/ch01/ev02/10/startup.html |

FIG.41

DATA BROADCASTING SCHEDULE INFORMATION MAP (HIERARCHY 3)
CORRESPONDING TO Fig. 36

| PROGRAM IDENTIFIER | BROADCASTING START TIME | DATA POSITION IN PRODUCED CONTENTS SERVER |
|---|---|---|
| 33 | CM-BB | URI://cserver/ch01/ev02/10/back.jpg |

FIG.42

DATA BROADCASTING SCHEDULE INFORMATION MAP (HIERARCHY 3)
CORRESPONDING TO Fig. 37

| PROGRAM IDENTIFIER | BROADCASTING START TIME | DATA POSITION IN PRODUCED CONTENTS SERVER |
|---|---|---|
| 33 | CM-BB | URI://cserver/ch01/ev02/10/intro.wav |
| 33 | CM-BB2 | URI://cserver/ch01/ev02/11/intro.wav |

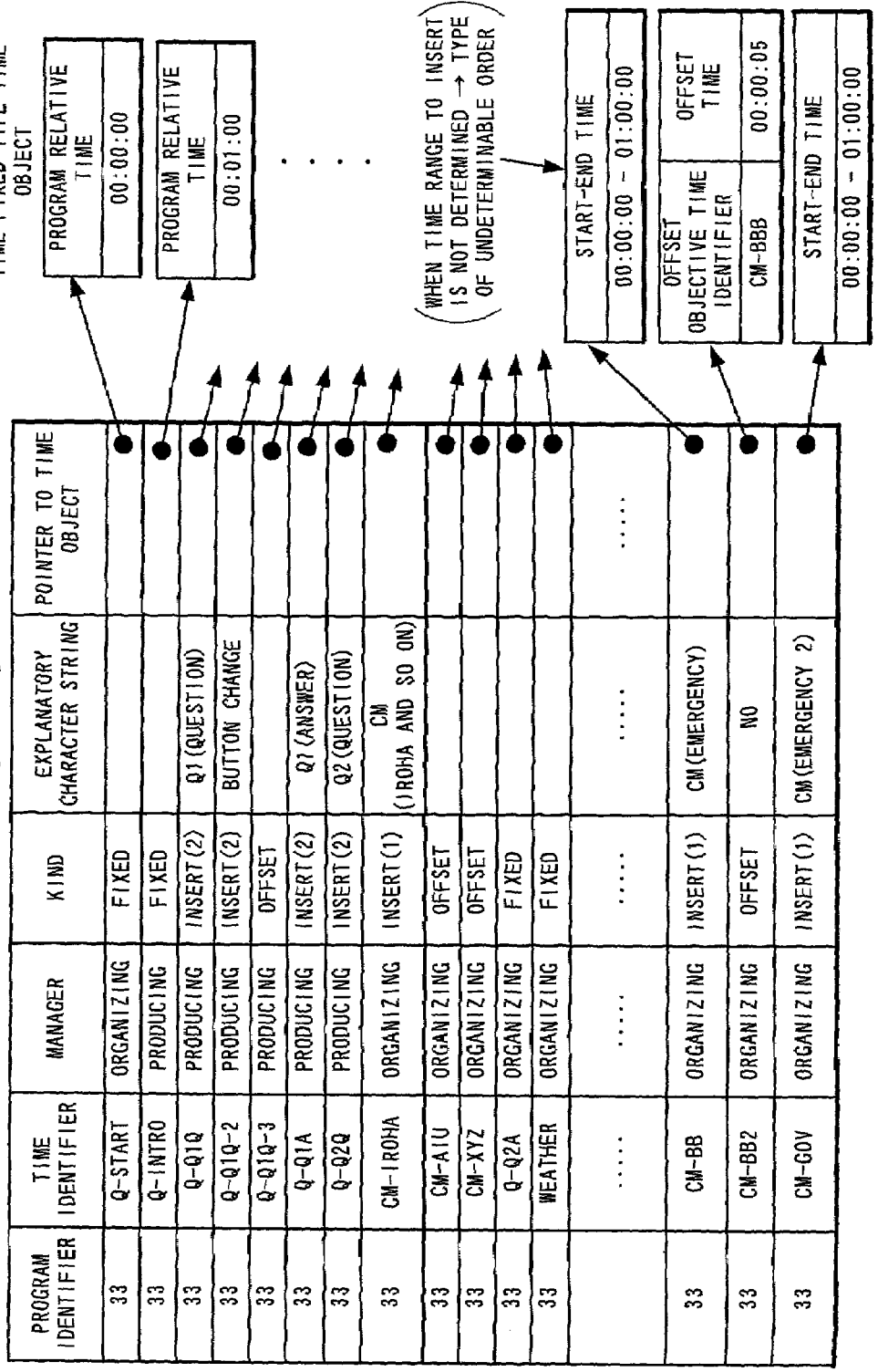

FIG.44

ORDER INFORMATION OF TIME
IDENTIFIER OF KNOWN ORDER

ORDER IS DERIVED FROM
PROGRAM RELATIVE TIME AND
BROADCASTING TIME RANGE

| Q-START |
| Q-INTRO |
| Q-Q1Q |
| Q-Q1Q-2 |
| Q-Q1Q-3 |
| Q-Q1A |
| Q-Q2Q |
| CM-IROHA |
| CM-AIU |
| CM-XYZ |
| Q-Q2A |
| ⋮ |
| WEATHER |

→ BASE DATA OF UNITARY BROADCASTING SCHEDULE INFORMATION MAP OF Fig. 47

FIG. 45

ORDER INFORMATION OF TIME
IDENTIFIER OF NOT KNOWN ORDER

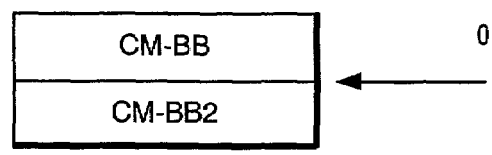

TIME IDENTIFIER OF NOT KNOWN
ORDER IS OBTAINED INDEPENDENTLY,
IF RELATED OFFSET TYPE
TIME OBJECT IS PRESENT,
IT CAN BE OBTAINED AS
A SET WITH TIME IDENTIFIER

FIG. 46

ORDER INFORMATION OF TIME
IDENTIFIER OF NOT KNOWN ORDER

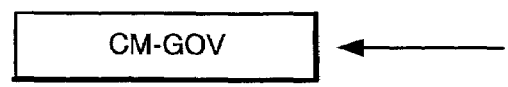

TIME IDENTIFIER OF NOT KNOWN
ORDER IS OBTAINED INDEPENDENTLY,
IF RELATED OFFSET TYPE
TIME OBJECT IS PRESENT,
IT CAN BE OBTAINED AS
A SET WITH TIME IDENTIFIER

FIG. 47

| TIME IDENTIFIER | IDENTIFICATION NUMBER | KIND | TITLE | COMPOSITE FILE NAME | PRODUCING IDENTIFICATION NUMBER | CONSTITUENT FILE | FILE POSITION |
|---|---|---|---|---|---|---|---|
| Q-START | 0100-0001 | PROGRAM | QUIZ ABC | opening | 0300-0001 | ... | ... |
| Q-INTRO | 0100-0001 | PROGRAM | QUIZ ABC | introduction | 0300-0002 | ... | ... |
| Q-Q1Q | 0100-0001 | PROGRAM | QUIZ ABC | Q1-question | 0300-0003 | startup.html<br>back.jpg<br>button.jpg<br>button2.jpg | URI://cserver/ch01/cv03/01/startup.html<br>URI://cserver/ch01/cv03/01/back.jpg<br>URI://cserver/ch01/ev03/01/button.jpg<br>URI://cserver/ch01/ev03/01/button2.jpg |
| Q-Q1Q-2 | 0100-0001 | PROGRAM | QUIZ ABC | Q1-question | 0300-0003 | startup.html<br>back.jpg<br>button.jpg<br>button2.jpg | URI://cserver/ch01/cv03/01/startup.html<br>URI://cserver/ch01/cv03/01/back.jpg<br>URI://cserver/ch01/ev03/02/button.jpg<br>URI://cserver/ch01/ev03/01/button2.jpg |
| Q-Q1Q-3 | 0100-0001 | PROGRAM | QUIZ ABC | Q1-question | 0300-0003 | startup.html<br>back.jpg<br>button.jpg<br>button2.jpg | URI://cserver/ch01/cv03/01/startup.html<br>URI://cserver/ch01/cv03/01/back.jpg<br>URI://cserver/ch01/ev03/02/button.jpg<br>URI://cserver/ch01/ev03/03/button2.jpg |
| Q-Q1A | 0100-0001 | PROGRAM | QUIZ ABC | Q1-answer | 0300-0004 | ... | ... |
| Q-Q2Q | 0100-0001 | PROGRAM | QUIZ ABC | Q2-question | 0300-0005 | ... | ... |
| ... | ... | ... | ... | | | | |
| CM-BB | 0200-0400 | CM | BB BROADCASTING STATION | bbb-cm | 0300-1000 | startup.html<br>back.jpg<br>intro.wav | URI://cserver/ch01/cv03/10/startup.html<br>URI://cserver/ch01/ev03/10/back.jpg<br>URI://cserver/ch01/ev03/10/intro.wav |
| CM-BB2 | 0200-0400 | CM | BB BROADCASTING STATION | bbb-cm | 0300-1000 | startup.html<br>back.jpg<br>intro.wav | URI://cserver/ch01/cv03/10/startup.html<br>URI://cserver/ch01/ev03/10/back.jpg<br>URI://cserver/ch01/ev03/11/intro.wav |
| CM-GOV | 0200-0500 | CM | EMERGENCY CM | gov-cm | 0300-1100 | ... | ... |

FIG.48

ASSOCIATION TYPE TIME OBJECT

| ASSOCIATION OBJECTIVE TIME IDENTIFIER |
|---|
| ASSOCIATION RELATIVE TIME |
| END TIME OR TIME IDENTIFIER |

FIG.54

| PROGRAM IDENTIFIER | BROADCASTING START TIMING (TIME IDENTIFIER) | CONTINUING TIME | IDENTIFICATION NUMBER | KIND | TITLE |
|---|---|---|---|---|---|
| 33 | Q-START | 00:15:00 | 0100-0001 | PROGRAM | QUIZ ABC |

| PROGRAM IDENTIFIER | BROADCASTING START TIMING (TIME IDENTIFIER) | PRODUCING IDENTIFICATION NUMBER | COMPOSITE FILE NAME | CONSTITUENT FILE NAME LIST |
|---|---|---|---|---|
| 33 | Q-Q1Q | 0300-0003 | Q1-question | startup.html<br>back.jpg<br>button.jpg<br>button2.jpg |

| PROGRAM IDENTIFIER | BROADCASTING START TIMING (TIME IDENTIFIER) | DATA POSITION IN PRODUCED CONTENTS SERVER |
|---|---|---|
| 33 | Q-Q1Q | URI://cserver/ch01/ev03/01/startup.html |

| PROGRAM IDENTIFIER | BROADCASTING START TIMING (TIME IDENTIFIER) | DATA POSITION IN PRODUCED CONTENTS SERVER |
|---|---|---|
| 33 | Q-Q1Q | URI://cserver/ch01/ev03/01/back.jpg |

| PROGRAM IDENTIFIER | BROADCASTING START TIMING (TIME IDENTIFIER) | DATA POSITION IN PRODUCED CONTENTS SERVER |
|---|---|---|
| 33 | Q-Q1Q-2 | URI://cserver/ch01/ev03/03/button.jpg |

| PROGRAM IDENTIFIER | BROADCASTING START TIMING (TIME IDENTIFIER) | DATA POSITION IN PRODUCED CONTENTS SERVER |
|---|---|---|
| 33 | Q-Q1Q | URI://cserver/ch01/ev03/01/button2.jpg |

COMPOSITE MEDIA FILE BROADCASTING PROGRAM BROADCASTING CONTROL SYSTEM

BACKGROUND OF THE INVENTION

1. Field of the Invention

The present invention relates generally to a composite media file broadcasting program broadcasting control system. More particularly, the invention relates to a broadcasting control system of a composite media file broadcasting program having an interactive function in a digital broadcasting.

2. Description of the Related Art

A video and audio broadcasting program broadcasting system in television and radio is generally constructed with an organizing unit managing a program frame of each program to be broadcasted in one channel and a time frame for commercial message in the program frame, a producing unit producing a broadcasting contents and a broadcasting unit performing broadcasting of broadcasting data along designated broadcasting schedule information.

Such video and audio broadcasting program broadcasting system is controlled by a broadcasting schedule information map called as a play list. Here, a broadcasting schedule information map is a table describing information permitting the broadcasting unit to correctly broadcast the contents produced by the organizing unit or the production unit. More particularly, the broadcasting schedule information map is a table, in which a certain program frame is divided into smaller time frames and for each frame, a broadcasting start time, a broadcasting continuing period, and an attribute value of the broadcasting content to be broadcasted in the corresponding time frame. The play list describes a broadcasting start time, a broadcasting continuing period, kind of the contents to be broadcasting in the time frame, i.e. broadcasting program or commercial message, and address information of video content and audio content to be broadcasted in the corresponding time frame, which play list is prepared by the organizing unit. The producing unit sets the video content and the audio content to be broadcasted in the address designated in the play list. The broadcasting unit obtains the content in the designated address on the basis of the play list from the producing unit to perform broadcasting preparatory process for processing into a broadcasting data in a form capable of broadcasting for broadcasting prepared broadcasting data at designated broadcasting start time.

Among the broadcasting programs, it is expected to modify the broadcasting schedule, such as extension or early termination of game, such as sport relay program. The broadcasting program broadcasting control system has to be instantly responsive to such change to perform control for performing broadcasting with modified broadcasting schedule. In case of expected modification of the broadcasting schedule information, the broadcasting schedule is modified by modifying the play list to transfer the modified schedule to the broadcasting unit.

A multi-channel broadcasting system disclosed in Japanese Unexamined Patent Publication (Kokai) No. Heisei 10-285505 (which will be referred to hereinafter as "first prior art") is a system characterized by adaptation for abrupt change of the broadcasting contents. In the disclosed system, a basic play list and a modified play list are prepared so that, when the broadcasting contents are modified, a part of the basic play list is replaced with the modified play list adapting to the broadcasting contents. At this time, since the broadcasting unit preliminarily obtain contents designated in both play lists for preparation of broadcasting, broadcasting corresponding to abrupt modification process can be realized.

The foregoing is related to the video and audio broadcasting program broadcasting system broadcasting a stream media, such as video, audio and so forth.

In the digital broadcasting, there are some broadcasting programs which broadcasts non-stream media data, such as composite media file and so forth. The composite media file broadcasting program is called as data broadcasting program. There are two kinds of broadcasting. One is the broadcasting program, in which the composite media file is solely broadcasted. The other is the broadcasting program, in which the composite media file is broadcasted as additional information cooperative with video program (stream media program) for presenting both of video program and the composite media file simultaneously.

One of broadcasting method of the composite media file is DSM-CC (Digital Storage Media Command Control) data carousel system defined in ISO (International Standardization Organization)/IEC (International Electrotechnical Commission) 13818-6. In this system, respective files forming the composite media file is repeatedly broadcasted so that the broadcasted composite media file can be obtained by starting viewing the program at any timing. The broadcasted data to be broadcasted in this system is consisted of data of constituent files of the composite media file (DDB: Download Data Block), and broadcasting control data, such as each file name, file sizes, file types, version number of files incremented at every occasion of updating.

The present invention is applicable for the composite media file broadcasting program broadcasting system employing the DSM-CC data carousel system. The composite media file broadcasting program broadcasting file basically has similar structure as the video and audio broadcasting program broadcasting system. Namely, broadcasting of the program is performed by the organizing unit, the producing unit and the broadcasting unit.

The broadcasting schedule information map controlling the video and audio broadcasting program broadcasting system is only the play list prepared by the organizing unit.

The composite media file broadcasting program broadcasting system is also controlled according to a broadcasting schedule information map (which will be referred to as organized schedule information map for discriminating from the play list). However, in addition to this, it has to be controlled even by the broadcasting schedule information map prepared by the producing unit. The reason is that since the composite media file is static different from the stream media, if the display content of the data broadcasting program is desired to vary according to elapse of time within the time frame, the broadcasting data has to be varied at every occasion of varying display content and the broadcasting schedule information map for this purpose is present. Variation is divided into two stages. Namely, modification to change overall composite media file in the time frame of the organized schedule information and modification by updating content of each file forming the composite media file are present. The producing unit prepares both broadcasting schedule information maps respectively adapting to the foregoing two stages of modifications in addition to the composite media file to be object for broadcasting. The former broadcasting schedule information map will be hereinafter referred to as "composite media file modified schedule information map" and the later broadcasting schedule information map will be hereinafter referred to as "file updating schedule information map".

Namely, the broadcasting schedule information map of one composite media file broadcasting program is consisted of the organized schedule information map as the broadcasting schedule information map per time frame prepared by the organizing unit, the composite media file modified schedule information map prepared by the producing unit, the file updating schedule information map for each constituent files of the composite media file.

The broadcasting unit of the composite media file broadcasting program combines the organized schedule information map prepared by the organizing unit, the composite media file modified schedule information map prepared by the producing unit and the file updating schedule information map for each constituent files of the composite media file for deriving the minimum time frame in which modification of the broadcasted data is performed, obtaining aggregate of the file forming the composite media file to be broadcasted per time frame to prepare the broadcasting data from the aggregate of the file (broadcasting preparatory process). Then, at the broadcasting start time of each time frame, the prepared broadcasting data is broadcasted.

The aggregate of the constituent files of the composite media file, for which broadcasting is initiated at a certain timing, is obtained by combining file updating schedule information map of all constituent files of the composite media file. For example, for the composite media file consisted of constituent files A and B, when the content of the file A is updated to a-a' and -a" at a time 7:00-7:10-7:20, and the content of the file B is updated to b-b' at a time 7:00-7:05, the aggregate of the file to be broadcasted at respective broadcasting start timings are as follows:

| start broadcasting at 7:00: | a and b |
| start broadcasting at 7:05: | a and b' |
| start broadcasting at 7:10: | a' and b' |
| start broadcasting at 7:20: | a" and b' |

The foregoing is the case where the broadcasting start timings of the file updating schedule information map is filed.

In case of the composite media file broadcasting program associated with live video program, there is a program broadcasting mode wherein while the contents to be broadcasted is preliminarily determined, the broadcasting start timing is determined during broadcasting of the program as the broadcasting timing of the composite media file has to be synchronized with the broadcasted video image, which will be hereinafter referred to as untime broadcasting. For example, relay broadcasting of sporting game, such as baseball, a staff of a broadcasting station instructs starting of broadcasting of "Homerun Special Data Quiz Program" at a timing of homerun in the baseball. This is the untime broadcasting.

The untime broadcasting is transferred to the broadcasting unit with including the broadcasting schedule information having undetermined broadcasting start timing (untime broadcasting schedule information) in the broadcasting schedule information map prepared by the organizing unit and the producing unit. The broadcasting unit performs broadcasting process at the broadcasting start timing of untime broadcasting input from a trigger input device.

Even in the conventional video and audio broadcasting program broadcasting system, it has been adapted for untime broadcasting by untime broadcasting of commercial message (CM) or the like in radio program or modification of the broadcasting data by switch at a timing designated in the modification schedule information map as discussed in the first prior art. At this time, the play list for modification is present and information of the video contents and audio contents of the untime broadcasting is described. Therefore, broadcasting preparatory process is preliminarily performed in the broadcasting unit, the broadcasting data can be performed instantly responding to the designation of the broadcasting start timing.

If the broadcasting preparatory process cannot be performed before broadcasting of the program in the broadcasting unit, the broadcasting preparatory process is performed upon determination of the broadcasting start timing of the untime broadcasting. For process period, it is possible to cause incapability of broadcasting at the designated broadcasting start timing.

Upon performing broadcasting preparatory process in the composite media file broadcasting program, the aggregate of the constituent files forming the composite media file to be initiated broadcasting at a certain timing has to be obtained.

In order to obtain the aggregate of the files, context of the updating timing of respective files are required. For example, concerning the composite media file consisted of the files A and B, consideration is given for the file updating schedule where the content of the file A is updated to a-a'-a" at respective time of 7:00-7:10-7:20, and the content of the file B is updated to b-b' at certain timing. The timing at which b is updated to b' is untime broadcasting and is determined during broadcasting of the program. If the time is 7:05, the aggregate of the files to be broadcasted is as follows:

| start broadcasting at 7:00: | a and b |
| start broadcasting at 7:05: | a and b' |
| start broadcasting at 7:10: | a' and b' |
| start broadcasting at 7:20: | a" and b' |

When the timing to update b to b' is 7:15, the aggregate of the files to be broadcasting is as follows:

| start broadcasting at 7:00: | a and b |
| start broadcasting at 7:10: | a' and b |
| start broadcasting at 7:15: | a' and b' |
| start broadcasting at 7:20: | a" and b' |

At this time, the aggregate of the files to be broadcasting at the updating timing of b to b' is a' and b' and is different from a and b' in the former case. Namely, depending upon context of the broadcasting start timing of the untime broadcasting and the broadcasting start timing of the updating schedule of A, the aggregate of the files to be broadcasted at the broadcasting start timing of the untime broadcasting can be differentiated.

Accordingly, in order to perform the broadcasting preparatory process of the program, in which untime broadcasting is performed, in the broadcasting unit, the context of the broadcasting start timings of the file updating schedule information of respective files forming the composite media file has to be definitely determined.

Accordingly, in order to realize broadcasting preparatory process of the untime broadcasting, some measure in expression method of the broadcasting start timing in the broadcasting schedule information map has to be taken.

The broadcasting program is often subject to reusing. In addition to rebroadcasting, the image of CM is used repeatedly, and also, the part of the broadcasted program may be reused at introduction or ending of the series program.

Reusing of the conventional video and audio broadcasting program can be easily realized by diversion of the video content and the audio content without any process. When the program is reused together with CM, reusing can be realized by rewriting the broadcasting start time in the play list.

In case of reusing of the composite media file broadcasting program, not only the composite media file per se but also the file updating schedule information are inherently required, and may further required the composite media file modification schedule information. The broadcasting schedule information map is reused, modification of all broadcasting start timings becomes necessary. In the composite media file broadcasting program, a plurality of broadcasting schedule information maps established in hierarchy and respective broadcasting start timings are associated with each other, it has been desired to have an approach for modification of the broadcasting start timings without causing contradiction.

According to one aspect of the invention, a broadcasting unit is provided that attains an aggregate of constituent files of a composite media file per time identifier and that performs broadcasting preparatory process from a condition where fixed broadcasting start timing is not obtained by using order information of the time identifier and hierarchically presenting plurality of data broadcasting schedule information maps. Namely, even with the broadcasting schedule information map, in which the untime broadcasting schedule information of undetermined broadcasting start timing is present in admixing manner. broadcasting preparatory process can be performed as long as the order of the broadcasting start timing is fixed. Therefore, broadcasting can be performed instantly in response to determination of the broadcasting start timing.

SUMMARY OF THE INVENTION

An object of the present invention is to provide a composite media file broadcasting program broadcasting control system, in which a broadcasting unit may attain an aggregate of constituent files of a composite media file per time identifier and can perform broadcasting preparatory process from a condition where fixed broadcasting start timing is not obtained by using order information of the time identifier and hierarchically presenting plurality of data broadcasting schedule information maps.

Another object of the present invention is to provide a composite media file broadcasting program broadcasting control system which enables expressing the broadcasting schedule information map where an untime broadcasting schedule information is present even when the untime broadcasting schedule information order of the broadcasting start timing is unknown, to permit judgment whether the broadcasting preparatory process is possible or not and whereby to enable broadcasting preparatory process when the broadcasting schedule information map in higher hierarchy is present.

A further object of the present invention is to provide a composite media file broadcasting program broadcasting control system which can derive the broadcasting start timing without tracing the hierarchy of the broadcasting schedule information maps by separately holing a plurality of data broadcasting schedule information maps for which real time values are not set and the time information which can be expressed independently and linearly.

A still further object of the present invention is to provide a composite media file broadcasting program broadcasting control system which can realize shifting of the broadcasting start timing required for changing of the broadcasting start timing of the program or for reusing, with simple process by varying the value set in a time object without varying the broadcasting schedule information maps.

A yet further object of the present invention is to provide a composite media file broadcasting program broadcasting control system, in which all broadcasting start timings are expressed along a single time axis and thus makes complicate process, such as tracing of the hierarchy of the broadcasting schedule information maps upon obtaining the time value.

A still further object of the present invention is to provide a composite media file broadcasting program broadcasting control system, in which an attribute is added to time information managed independently of the broadcasting schedule information map, and classifying means is provided for classification based on the attribute for simplification of taking out only broadcasting schedule information to be object for working.

A still further object of the present invention is to provide composite media file broadcasting program broadcasting control system which enables broadcasting control of the program designated a screen modification timing in various modes by using four kinds of time objects.

A still further object of the present invention is to provide composite media file broadcasting program broadcasting control system which can discriminate portions for which broadcasting preparatory process is possible and portions for which broadcasting preparatory process is not possible in one program by using time classification codes, and enables broadcasting preparatory process for the portion other than the portions where the broadcasting preparatory process is not possible, and thus enables instantly broadcasting of next broadcasting data by the broadcasting unit.

A yet further object of the present invention is to provide a composite media file broadcasting program broadcasting control system, in which a schedule control unit is provides a function for outputting data broadcasting schedule information to be broadcasting at timing from order information of the several kinds of time objects to enable broadcasting unit to prepare broadcasting data.

A yet further object of the present invention is to provide a composite media file broadcasting program broadcasting control system which enables broadcasting preparatory process by providing a function for outputting order information of several kinds of time objects for the schedule control unit even in the program where the order of the time objects is undeterminable.

According to one aspect of the invention, a composite media file broadcasting program broadcasting control system comprising:

an organizing unit generating and managing organized schedule information map expressing program frame and time frame of CM in the program frame as broadcasting information;

a producing unit obtaining broadcasting schedule information map based on the organized schedule information map generated by the organizing unit, assigning composite media file to be actually broadcasted to each time frame expressed in the broadcasting schedule information map and generating composite media file modification schedule information map and file updating schedule information map of each file forming the composite media file;

a schedule control unit receiving the organized schedule information map managed by the organizing unit, the composite media file modification schedule information map and the file updating schedule information map held in the producing unit and performing unitary management thereof; and a broadcasting unit for broadcasting a broadcasting data to a transmission line according to a broadcasting schedule information provided from the schedule control unit.

In the preferred construction, the composite media file broadcasting program broadcasting control system further comprises a storage device storing a program information, a broadcasting schedule information map and a time information; and a trigger input device commanding modification of the broadcasting data of the program on broadcasting to the broadcasting unit.

In another preferred construction, the organizing unit includes organized schedule information map input means for inputting the program information and the organized schedule information map to the schedule control unit.

In another preferred construction, the producing unit includes map input means for inputting the composite media file modification schedule information map and the file updating schedule information map for each file forming the composite media file to the schedule control unit.

In another preferred construction, the broadcasting unit comprises:

unitary broadcasting schedule information map generating means for obtaining the broadcasting schedule information map and order information of time identifiers used in the broadcasting schedule information map obtained from the schedule control unit and generating a unitary broadcasting schedule information map;

broadcasting preparing means for performing broadcasting preparatory process on the basis of the unitary broadcasting schedule information map generated by the unitarily broadcasting schedule information map generating means; and composite media file broadcasting means for broadcasting a broadcasting data prepared per designated broadcasting start timing.

In another preferred construction, the schedule control unit comprises:

broadcasting schedule information map registering means for univocally assigning a program identifier to a program, storing attribute information input from the organizing unit and program information of the map of the program identifier, and generating data broadcasting schedule information map and a time object map from the broadcasting schedule information map for storing in the storage device;

broadcasting schedule information map outputting means for outputting the data broadcasting schedule information map of the program to be object from input program associated information; and time information output means for outputting order information on a time axis of the time object and time object map.

In another preferred construction, the storage device comprises:

program information storage portion for storing program information;

broadcasting schedule information map storage portion for hierarchically storing the broadcasting schedule information map;

time information storage portion for storing time object map and time object.

In another preferred construction, the trigger input device comprises:

a plurality of broadcasting data modification trigger input devices providing modification command of the broadcasting data to the broadcasting unit upon performing untime broadcasting.

According to another aspect of the invention, a composite media file broadcasting program broadcasting control method in a composite media file broadcasting program broadcasting control system including an organizing unit managing program frame and time frame of CM in the program frame, producing unit generating a composite media file to be broadcasted and broadcasting schedule information, broadcasting unit performing broadcasting of broadcasting data to a transmission line according to information provided from the organizing unit and the producing unit, and a trigger input device designating modification of broadcasting data of the program on broadcasting to the broadcasting unit, the method comprising the steps of:

setting pointer information to broadcasting schedule information map storing broadcasting start timing without setting real time value as broadcasting start timing of a plurality of the broadcasting schedule information map in hierarchy;

storing time object and attribute information thereof expressing one point on a time axis in the broadcasting schedule information map storing the broadcasting start timing;

enabling broadcasting preparatory process in the broadcasting unit even in a condition where broadcasting start timing is not fixed by expressing order of time by time expressing function provided for the time object; and performing broadcasting instantly responding to determination of broadcasting start timing during broadcasting.

In the preferred construction, a time identifier as identification information of the time object is set in the broadcasting start timing of the broadcasting schedule information and expressing association on a time axis of different broadcasting schedule information maps by using the same time identifier when the same timing is expressed in different broadcasting schedule information map.

In another preferred construction, in the time object, context of the time objects on a time axis is expressed by three kinds of times of time fixed type, range designation type and offset designation type and discriminate the time not known the context.

In another preferred construction, the context of broadcasting start timing of broadcasting schedule information at the same or different hierarchical levels on the time axis by the time object of range designation type and offset designation type.

In another preferred construction, which uses kind of unit generated the time object, such as organizing unit, producing unit or the like, kind of time object, such as time fixed type, range designation type and offset designation type, kind of trigger input device determining a real time value for the time object in range designation, and extending character string as attribute information of the time object registered in the time object map, classifying broadcasting schedule information determining broadcasting schedule information fixing broadcasting start timing in the broadcasting unit, broadcasting schedule information of not fixed time and time are determined in association, and obtaining time list to be determined by the trigger input device by realizing classification function of the time object by the attribute information.

In another preferred construction, lump modification of time information is realized by expressing only pointer information to the time information without presenting real time value in the broadcasting schedule information for facilitating partial reusing of the composite media file broadcasting program.

In another preferred construction, the time object of time fixed type expresses a time by real time value, the offset designation type time object expresses time with the time identifier of the objective time object and relative time from the time object, and the range designation type time object expresses the time with range start time value or the time identifier of the time object using the range start time value and range end value or the time identifier of the range end time.

In another preferred construction, the time object further includes an association type expressing context of time objects on the time axis by expressing the time with the time identifier of the objective time object and start relative time and end time in addition to three kinds of time objects of time fixed type, range designation type and offset designation type, and whereby discriminating the time object unknown the context.

In another preferred construction, the context of the broadcasting start timings of the broadcasting schedule information of the same or different hierarchical levels on the time axis by the range designation type, offset designation type and associated type time objects.

In another preferred construction, the trigger input device for permitting user to determined broadcasting start timing, presents time range where the time becomes effective on a user interface, by expressing the broadcasting start timing of the broadcasting schedule information by the range designation type and association type time object.

In another preferred construction, the schedule control unit is provided with a function for making judgment whether the aggregate of four kinds of time objects of the time fixed type, range designation type, offset designation type and association type can be sorted in order of time or not, and if sorted, utilizing topological sorting theory of the order of the time object.

In another preferred construction, screen image modification timing to be provided trigger from the trigger input device in a time range by the time fixed type and range designation type time object, the schedule control unit is provided with a function for making judgment of order of the time objects for enabling broadcasting of data broadcasting program performed screen image modification.

In another preferred construction, screen image modification timing to be provided trigger from the trigger input device in a time range by the time fixed type, range designation type and offset designation type time object, the schedule control unit is provided with a function for making judgment of order of the time objects for enabling broadcasting of data broadcasting program performed screen image modification.

In another preferred construction, screen image modification timing to be provided trigger from the trigger input device in a time range by the time fixed type, range designation type and association type time object, the schedule control unit is provided with a function for making judgment of order of the time objects for enabling broadcasting of data broadcasting program performed screen image modification.

In another preferred construction, four kinds of time objects of time fixed type, range designation type, offset designation type and association type are used for expressing screen image modification timing provided trigger by the trigger input device in a certain time range, expressing screen image modification timing for modifying screen image after a given period from trigger, and expressing screen image modification timing provided trigger from the trigger input device in a time range before a certain timing, and the schedule control unit is provided function for judgment of order of time object for enabling broadcasting of data broadcasting program with admixed screen image modification modes.

In another preferred construction, which is provided function for designating condition utilizing attribute information of the time object registering the time object map, taking out partial aggregate of time object having attribute adapted to the condition from the aggregate of the time object of the program and making judgment whether the time objects forming the partial aggregate can be sorted in order of time or not and order of time object as can be sorted.

In another preferred construction, which uses kind of unit generated the time object, such as organizing unit, producing unit or the like, kind of time object, such as time fixed type, range designation type and offset designation type, kind of trigger input device determining a real time value for the time object in range designation, and extending character string as attribute information of the time object registered in the time object map, classifying broadcasting schedule information determining broadcasting schedule information fixing broadcasting start timing in the broadcasting unit, broadcasting schedule information of not fixed time and time are determined in association, and obtaining time list to be determined by the trigger input device by realizing classification function of the time object by the attribute information.

In another preferred construction, broadcasting data is broadcasted instantly responding to the timing of trigger by enabling broadcasting preparatory process even for the portion where the judgment of order is possible by dividing the program into a plurality of time zones upon organization and production even in the program, in which judgment of order of time of the time object can be made and the portion judgment of the order of time of the time object is not possible, by using the time classification code of the attribute information of the time object registered in the time object map.

In another preferred construction, as the attribute information of the time object to be registered in the time object map, kind of the time object is provided for enabling handing of time objects having different data structure in single time object map with maintaining accessibility of particular kind of time object.

In another preferred construction, the time object expressing one point on the time axis in various mode is handled with single time object map in a lump, an attribute for discriminating kind of the time object in the time object map to handle the screen image modification timing with the identifier as a common item to be provided in respective time object in the data broadcasting schedule information map, to define the time object having new data structure when the time expressing not premised in the screen image modification timing for adaptation without requiring modification of the data broadcasting schedule information map.

In another preferred construction, the schedule control unit has a function for outputting data broadcasting schedule information, in which when the order of the time object is determined, the schedule control unit takes the time indicated by each time object as the broadcasting start timing, for facilitating generation of the unitary broadcasting schedule information map from the time object map.

In another preferred construction, the broadcasting unit includes a function for designating a plurality of variations of order of aggregates of the time objects as demanding order of the aggregates of the time object to the schedule control unit, when the order of the aggregates of the time objects is judged by the schedule control unit, if some candidates of the order are present, and if number of the candidates falls within a designated number, broadcasting preparation process corresponding to all candidates are performed by the broadcasting by providing a function for outputting all candidates, when the time of the time object is fixed by trigger and order of the aggregates of the time objects is fixed, by selecting the broadcasting data corresponding to the fixed order from the prepared broadcasting data for enabling instantly broadcasting the broadcasting data without performing broadcasting preparation process for broadcasting of the broadcasting data instantly responding to the trigger timing.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 2 is an illustration showing a data structure showing a time object map in the first embodiment of the composite media file broadcasting program broadcasting control system according to the present invention;

FIG. 3 is an illustration showing a data structure showing three kinds of time objects in the first embodiment of the composite media file broadcasting program broadcasting control system according to the present invention;

FIG. 5 is an illustration exemplifying program information in the first embodiment of the composite media file broadcasting program broadcasting control system according to the present invention;

FIG. 6 is an illustration exemplifying an organized schedule information map in the first embodiment of the composite media file broadcasting program broadcasting control system according to the present invention;

FIG. 7 is an illustration exemplifying information stored in a storage device at a timing where organized schedule information map is registered in the first embodiment of the composite media file broadcasting program broadcasting control system according to the present invention, wherein program information stored in the program information storage portion;

FIG. 8 is an illustration exemplifying information stored in the storage device at a timing where the organized schedule information map is registered in the first embodiment of the composite media file broadcasting program broadcasting control system according to the present invention, wherein data broadcasting schedule information map (hierarchy 1) stored in the broadcasting schedule information map storage portion;

FIG. 9 is an illustration exemplifying information stored in the storage device at a timing where the organized schedule information map is registered in the first embodiment of the composite media file broadcasting program broadcasting control system according to the present invention, a time object map is stored in a time information storage portion;

FIG. 10 is an illustration exemplifying composite media file modification schedule information map corresponding to a broadcasting schedule information of a time identifier "Q-START" in FIG. 8;

FIG. 11 is an illustration showing the composite media file modification schedule information map of startup.htm as an example of composite media file modification schedule information map named as "Q1-question" in FIG. 10;

FIG. 12 is an illustration showing the composite media file modification schedule information map of back.jpg as an example of composite media file modification schedule information map named as "Q1-question" in FIG. 10;

FIG. 13 is an illustration showing the composite media file modification schedule information map of button.jpg as an example of composite media file modification schedule information map named as "Q1-question" in FIG. 10;

FIG. 14 is an illustration showing the composite media file modification schedule information map of button2.jpg as an example of composite media file modification schedule information map named as "Q1-question" in FIG. 10;

FIG. 18 is an illustration exemplifying the data broadcasting schedule information map (hierarchy 2) registered corresponding to FIG. 10;

FIG. 19 is an illustration exemplifying the broadcasting schedule information map (hierarchy 1) stored in the broadcasting schedule information map storage portion at a timing where registration of information of a producing unit is completed in the first embodiment of the composite media file broadcasting program broadcasting control system according to the present invention;

FIG. 20 is an illustration exemplifying data broadcasting schedule information map (hierarchy 3) registered corresponding to FIG. 11, showing data broadcasting schedule information map (hierarchy 3) registered corresponding to FIG. 11;

FIG. 21 is an illustration showing data broadcasting schedule information map (hierarchy 3) registered corresponding to FIG. 12;

FIG. 22 is an illustration showing data broadcasting schedule information map (hierarchy 3) registered corresponding to FIG. 13;

FIG. 23 is an illustration showing data broadcasting schedule information map (hierarchy 3) registered corresponding to FIG. 14;

FIG. 24 is an illustration exemplifying a time object map stored in the time information storage portion at a timing where registering of information of the producing unit is completed in the first embodiment of the composite media file broadcasting program broadcasting control system according to the present invention;

FIG. 26 is an illustration exemplifying united broadcasting schedule information map prepared for broadcasting preparatory process by the broadcasting unit in the first embodiment of the composite media file broadcasting program broadcasting control system according to the present invention;

FIG. 27 is an illustration showing a time fixed type time object map as an example of a time object map output per time kind by time information output UNIT in the first embodiment of the composite media file broadcasting program broadcasting control system according to the present invention;

FIG. 28 is an illustration showing a offset designation type time object map as an example of a time object map output per time kind by time information output unit in the first embodiment of the composite media file broadcasting program broadcasting control system according to the present invention;

FIG. 29 is an illustration showing a range designation type time object map as an example of a time object map output per time kind by time information output unit in the first embodiment of the composite media file broadcasting program broadcasting control system according to the present invention;

FIG. 30 is an illustration showing a range designation type time object map as an example of a time object map output per time kind by time information output unit in the first embodiment of the composite media file broadcasting program broadcasting control system according to the present invention;

FIG. 31 is an illustration exemplifying a user interface of a trigger input device in the first embodiment of the composite media file broadcasting program broadcasting control system according to the present invention;

FIG. 33 is an illustration exemplifying an organized schedule information in the second embodiment of the composite media file broadcasting program broadcasting control system according to the present invention;

FIG. 34 is an illustration exemplifying composite media file modification schedule information map and file updating schedule information map in the second embodiment of the composite media file broadcasting program broadcasting control system according to the present invention, showing a composite media file modification schedule information map corresponding to a frame of "BB broadcasting station";

FIG. 35 is an illustration showing a file updating schedule information map of startup.html of bb-cm;

FIG. 36 is an illustration showing a file updating schedule information map of back.jpg of bb-cm;

FIG. 37 is an illustration showing a file updating schedule information map of intro.wave of bb-cm;

FIG. 38 is an illustration exemplifying data broadcasting schedule information map in the second embodiment of the composite media file broadcasting program broadcasting control system according to the present invention, in which illustrated the data broadcasting schedule information map (hierarchy 1) corresponds to FIG. 33;

FIG. 39 is an illustration showing the data broadcasting schedule information map (hierarchy 2) corresponding to FIG. 34;

FIGS. 40, 41 and 42 are illustrations showing data broadcasting schedule information map in the second embodiment of the composite media file broadcasting program broadcasting control system, in which FIG. 40 is an illustration showing the data broadcasting schedule information map (hierarchy 3) corresponding to FIG. 35, FIG. 41 is an illustration showing the data broadcasting schedule information map (hierarchy 3) corresponding to FIG. 36, and FIG. 42 is an illustration showing the data broadcasting schedule information map (hierarchy 3) corresponding to FIG. 37;

FIG. 43 is an illustration exemplifying a time object map stored in the second embodiment of the composite media file broadcasting program broadcasting control system according to the present invention;

FIG. 44 is an illustration exemplifying an order information of the time identifier obtained from the schedule control unit in the second embodiment of the composite media file broadcasting program broadcasting control system according to the present invention, showing the order information of the time identifier in which the order is known;

FIG. 45 is an illustration exemplifying an order information of the time identifier obtained from the schedule control unit in the second embodiment of the composite media file broadcasting program broadcasting control system according to the present invention, showing the order information of the time identifier in which the order is not known;

FIG. 46 is an illustration exemplifying an order information of the time identifier obtained from the schedule control unit in the second embodiment of the composite media file broadcasting program broadcasting control system according to the present invention, showing the order information of the time identifier in which the order is not known;

FIG. 47 is an illustration exemplifying a united broadcasting schedule information map prepared for broadcasting preparatory process by the producing unit in the second embodiment of the composite media file broadcasting program broadcasting control system according to the present invention;

FIG. 48 is an illustration showing a data structure showing an association type time object to be used in the third embodiment of the composite media file broadcasting program broadcasting control system according to the present invention;

FIG. 54 is an illustration showing an example of data broadcasting schedule information corresponding to a time identifier "Q-Q1Q-2" obtained from the schedule control unit in the fifth embodiment of the composite media file broadcasting program broadcasting control system according to the present invention;

DESCRIPTION OF THE PREFERRED EMBODIMENTS

Figure 1:
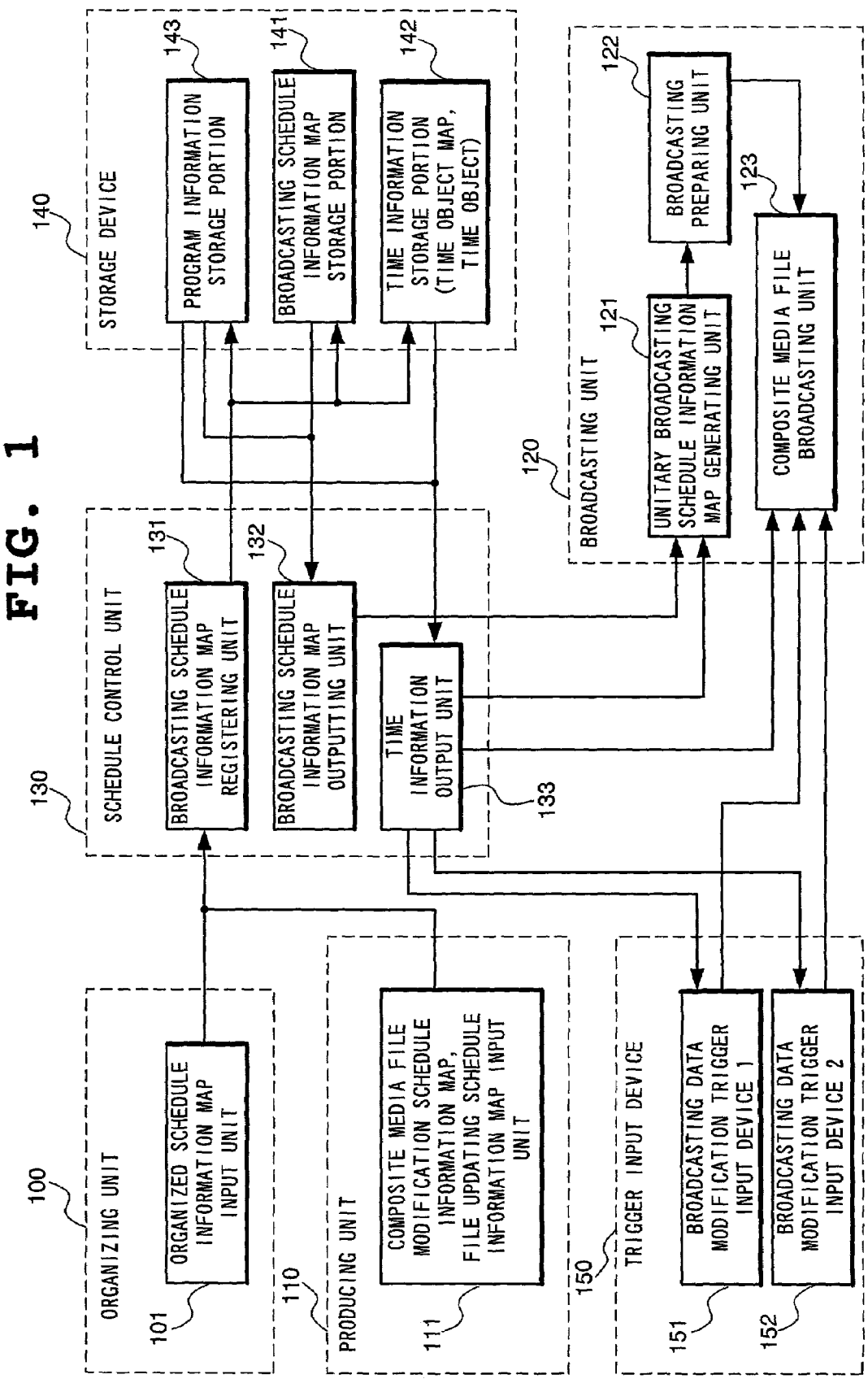
FIG. 1 is a block diagram showing a construction of the first embodiment of a composite media file broadcasting program broadcasting control system according to the present invention.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

At first, outline of the present invention will be discussed.

A composite media file broadcasting program broadcasting control system according to the present invention is constructed with an organizing unit which manages program frames and time frame for CM in the program frame, a producing unit producing composite media file to be broadcasted and a broadcasting schedule information of the produced composite media file, a broadcasting unit preparing broadcasting data according to the broadcasting schedule information provided from the organizing unit and the producing unit and feeding the broadcasting data to a transmission path, a trigger input device commanding modification of the broadcasting data of the on-broadcasting program to the broadcasting unit, a schedule control unit concentrically managing the organized schedule information map held by the organizing unit, a composite media file modification schedule information map and a file updating schedule information map held by the producing unit, and a storage device storing program information, a broadcasting schedule information map and a time information.

The broadcasting schedule information map stored in the storage device will be hereinafter referred to as data broadcasting schedule information map distinguishing from that held by the producing unit.

In the storage device, broadcasting start timing contained in each hierarchy of data broadcasting schedule information map is expressed by a time identifier. Detailed time information is managed by a time information storage portion independently of the broadcasting schedule information. The time identifier expresses one point on a time axis solely present per program/When the same time is expressed, the same time identifier as the broadcasting start timing of the broadcasting schedule information is set.

The time information is stored in a form of a time object expressing a time and an attribute information of the map (which will be referred to as time object map). The time object and the attribute value can be retrieved from corresponding time identifier set in the broadcasting schedule information.

The time object is established as an object of the expressing method the time for the purpose of extension for adaptation to the case where employment of new time becomes necessary. In the current employment method, three kinds of time objects are defined. Types of the time object may be a fixed time type expressing a real time value (relative time from program starting), a range designation type expressing a time as one point in a certain time range, and an offset designation type expressing the time in a form determined in association with other time information.

The schedule control unit has time information output unit for outputting order information of these time objects. When a time object which is not judged the order in time is present, it is output as not judged.

In the attribute information of each time object contained in the time object map, corresponding time identifier, kind of the unit determining broadcasting start timing expressing the time object (organizing unit or producing unit), time identification (in the case where the time object is range designation type, kind of trigger input device fixing undetermined broadcasting start timing), type of three kinds of time object and explanatory character string are contained. The schedule control unit has a function for retrieving the time object using the attribute as key.

In the schedule control unit, the order information of the time identifier by managing program information, the broadcasting schedule information map and time information and aggregate of file forming the composite media file and other broadcasting control data per time identifier by the broadcasting unit utilizing a plurality of data broadcasting schedule information maps presenting in hierarchy. Thus, broadcasting preparatory process from the condition where the fixed broadcasting start timing is not obtained, becomes possible.

This enables broadcasting preparatory process as long as the order of the broadcasting start timing is determined even when the broadcasting schedule information map and untime broadcasting schedule information where the broadcasting start timing is undetermined are admixingly present.

When the untime broadcasting schedule information undeterminable of order of the broadcasting start timing is present, judgment is made whether broadcasting preparatory process is possible or not in order to distinguish from the broadcasting start timing which is known the order.

On the other hand, since the broadcasting schedule information map is held separately as a plurality of data broadcasting schedule information maps and time information independently and linearly expressed. Therefore, even without tracing the hierarchy of the broadcasting schedule information maps, the broadcasting start timing can be obtained. The data broadcasting schedule information map which is not set real time value can be reused for reusing program.

Furthermore, shift of the broadcasting start timing required for modification and reuse of the broadcasting start timing of the program can be realized by simple process by modification of the time object.

In addition to three kinds of time objects as defined above, new time object is defined. This will be referred to as association type time object which expressed one point in a time range after a given time from other time object and before a certain time. These are two screen varying timing determined by a trigger in a manner that only after one screen variation, the other screen variation can be done. Namely, when one time is determined in association with the other time, variation timing of the screen is determined in association.

Using four kinds of time objects, aggregate of the variation timing of the screen is expressed.

Furthermore, time classification code is added in attribute information of the time object having the time object map. The time classification code is a numerical value added to a certain time range. The time object having the time classification code in attribute expresses a time within a given time range. Utilizing the attribute value, the time object to be used in one program can be divided into several partial aggregates. Usage of the time classification code is different depending upon operation. Here, it is assumed that the greater value expresses later partial aggregate.

(1) First Embodiment

In the first embodiment of the composite media file broadcasting program broadcasting control system according to the present invention, in broadcasting of data broadcasting program cooperated with line broadcasting program, modification of the broadcasting data during on air is commanded by the operator through operation of the trigger input device. Quickly responding to the designated time, broadcasting of the program is controlled so that the modified composite media file can be broadcasted.

FIG. 1 is a block diagram showing a construction of the first embodiment of the composite media file broadcasting program broadcasting control system according to the present invention. The shown embodiment of the composite media file broadcasting program broadcasting control system is mainly constructed with an organizing unit 100, a producing unit 110, a broadcasting unit 120, a schedule control unit 130, a storage device 140 and a trigger input device 150.

The organizing unit 100 prepares an organized schedule information map indicating broadcasting schedule information per program frame and per time frame of CM in the program frame. The organized schedule information map is input to the schedule control unit 130 by organized schedule information map input unit 101.

The producing unit 110 obtains a broadcasting schedule information map based on the organized schedule information map prepared by the organizing unit 100, from the schedule control unit 130 to assign the composite media file to be actually broadcasted to each time frame indicated in the obtained broadcasting schedule information map. At this time, the composite media file modification schedule information map and the file updating schedule information map of each constituent files forming the composite media file are also prepared. These broadcasting schedule information maps are input to the schedule control unit 130 by the composite media file modification schedule information map input unit 111.

The schedule control unit 130 is a unit unitarily manage the broadcasting schedule information of respective devices and units. The schedule control unit 130 includes a broadcasting schedule information map registering unit 131, the broadcasting schedule information map output unit 132 and a time information output unit 133.

The broadcasting schedule information map registering unit 131 uniquely assigns program identifier for management by storing attribute information (start time of the program frame, end time, program name and so forth) of the program input from the organizing unit 100 and the program identifier as a program information, in a program information storage portion 143. Furthermore, the broadcasting schedule information map registering unit 131 prepares data broadcasting schedule information map and a time object map expressing the real time value of the broadcasting start timing and attribute thereof from the broadcasting schedule information map input from the organized schedule information map input unit 101 and the composite media file modification schedule information map and file updating schedule information map input unit 111, through processes, such as assigning the program identifier, replacing the broadcasting start timing with the time identifier and so forth. The data broadcasting schedule information map is stored in the broadcasting schedule information map storage portion 141. On the other hand, the time object map is stored in a time information storage portion 142.

The broadcasting schedule information map output unit 132 outputs the data broadcasting schedule information map of the program to be objective from the program associated information.

The time information output unit 133 outputs an order information of the time objects on a time axis and the time object map.

The broadcasting unit 120 is constructed with a unitary broadcasting schedule information map generating unit 121, broadcasting preparing unit 122 and composite media file broadcasting unit 123 for performing broadcasting of the composite media file according to the broadcasting schedule information map generated by the organizing unit 100 and the producing unit 110. The unitary broadcasting schedule information map generating unit 121 obtains the broadcasting schedule information map relating to the program to be broadcasted from the broadcasting schedule information map output unit 132 and the order information of the time identifier to be used in the broadcasting schedule information map obtained from the time information output unit 133 to generate the unitary broadcasting schedule information map necessary for broadcasting preparatory process. The broadcasting preparing unit 122 obtains broadcasting content from a produced contents server (not shown) on the basis of the unitary broadcasting schedule information map generated by the unitary broadcasting schedule information map generating unit 121 and performs broadcasting preparatory process, such as processing of the broadcasting content into the broadcasting data format and generation of broadcasting control data. The composite media file broadcasting unit 123 performs broadcasting of the broadcasting data prepared per designated time.

The trigger input device 150 is constructed with a broadcasting data modification trigger input device 151 and a broadcasting data modification trigger input device 152 which provide command for modification of the broadcasting data in case of untime broadcasting to the broadcasting unit 120. Here, the reason why two broadcasting data modification trigger input devices are provided in the trigger input device 150, is for possibility of application of the command from different device depending upon nature of modification of the broadcasting data. For example, modification of the broadcasting contents relating to CM and modification of the display content for the program are likely to be triggered by different devices.

The storage device 140 is constructed with a broadcasting schedule information map storage portion 141, a time information storage portion 142 and a program information storage portion 143.

Examples of the program information stored in the program information storage portion 143 and data broadcasting schedule information map stored in the broadcasting schedule information map storage portion 141 will be discussed later together with flow of the process. Information stored in the program information and the data broadcasting schedule information map is variable depending upon operation method of the program broadcasting. Therefore, it is not essential to follow the example which will be discussed later.

Entry of the time object map stored in the time information storage portion 142 is shown in FIG. 2. Each entry of the time object map is set a pointer of the time object expressed by one point on respective time axis and an attribute information of the time object. In case of the shown embodiment, the attribute information is the five kinds of information of the time identifier, the program identifier, manager, kind of time and explanatory character string.

The time identifier is a unique value of the program and is an identifier of the time object. The program identifier is a unique value assigned for the program, with which the time object is used. The time identifier and the program identifier uniquely identify the broadcasting start timing as expressing object in combination.

The manager identifies a kind of unit which generated the broadcasting schedule information map relating to the broadcasting start timing expressed by the time object. In case of the shown embodiment, the manager may be either the organizing unit 100 or the producing unit 110. The kind of time represents the kind of the time object, and when the time is not determined, a value indicative of a kind of the device which fixes the time has to be set. The explanatory character string is a value mainly used when the time is not determined and contains explanatory information relating to the time to be used for transmitting what is varied when the time is fixed, to the system fixing the time.

In FIG. 3, (b-1), (b-2) and (b-3) express one point on a time axis in respective methods and referred to as time object.

There are three kinds of time objects.

Among three kinds of time object, in a time fixed type time object (see (b-1) of FIG. 3), a relative time from a program start timing can be set. The broadcasting schedule information expressing a time by the time fixed type time object is a fixed broadcasting schedule information. In a range designation type time object (see (b-2) of FIG. 3), the time is expressed as one point in a certain time range which is used for expressing the broadcasting schedule information for the content which has undetermined broadcasting start timing, namely for expressing the untime broadcasting schedule information. To the range designation type time object, the start time and end time of the time range within which the time of the time object can be fixed, can be set. As the start time and end time, either a relative time from the program start timing or other time identifier may be set. In an offset designation type time object (see (b-3) of FIG. 3), an offset objective time identifier and an offset time can be set for expressing the time in a manner of a relative time from the timing corresponding to the offset objective time identifier. This is used for expressing the broadcasting schedule information in corporation with other broadcasting schedule information, such as starting broadcasting after 20 seconds from starting CM.

With the construction set forth above, hierarchically presenting plurality of broadcasting schedule information maps registered by the organizing unit 100 and the producing unit 110 can be separated into the program information, the broadcasting schedule information map and the time information to be stored in the program information storage portion 143, the broadcasting schedule information map storage portion 141 and the time information storage portion 142.

In the storage device 140, the broadcasting start timing contained in the data broadcasting schedule information map in each hierarchical level is expressed by the time identifier. The detailed time information is managed by the time information storage portion independently of the broadcasting schedule information. The time identifier expressed one point on the time axis uniquely present per the program. When the same timing is expressed, the same time identifier is set at the broadcasting start timing of the broadcasting schedule information.

On the other hand, the time information is stored in a form a map of the time object expressing the time and its attribute information (time object map). From the time identifier set in the broadcasting schedule information, the time object and its attribute information can be retrieved. The time object is a expression method established as an object intending to extension ability adapting to the case new time operation method becomes necessary. In the current operation method, the foregoing three time objects are defined. Namely, the time fixed type expressing the real time value (relative time from starting program), the range designation type expressing the time as one point in a certain time range, and an offset designation type expressing the time determined in association with other time information.

The broadcasting schedule information map output unit 132 outputs the data broadcasting schedule information map of the objective program from input information relating to the program. The broadcasting schedule information map output unit 132 collates the input program information with the program information stored in the program information storage portion 143 to obtain the program identifier to be an object. Also, the data broadcasting schedule information map in which the relevant program identifier is set is obtained from the broadcasting schedule information map storage portion 141.

The time information output unit 133 mainly outputs two information. One is an order of the time object in which one program belong. The order is derived from the time information contained in each kind of time object and output in a form of a list of the time identifier. It should be noted that there are some time object whose order is indefinite, such as the case where the time range to be expressed by the range designation type time object extends over the entire program. Therefore, the time object whose order is indefinite is discriminated from those having definite order and output as separate time identifier list.

The other is to filter the time object map stored in the time information storage portion 143 as required for outputting the time object map for particular demand. Filtering is performed using the attribute value set in the time object map. Accordingly, the time object map separated depending upon the program identifier, the time identifier, the manager and the kind of time. For example, the time object map, such as "time object map containing program identifier being 10 and the manager being organizing unit" or "fixed time object map containing program identifier being 20" can be output. Of course, it is also possible to output one entry of the time object map using the program identifier and the time identifier.

Next, operation of the first embodiment of the composite media file broadcasting program broadcasting control system constructed as set forth above will be discussed, Here, in the first embodiment, flow of broadcasting control from assignment of the program frame for certain program to broadcasting of the broadcasting data will be discussed together with an example of broadcasting schedule information map generated by respective units and the data broadcasting schedule information map stored in the storage device 140 by the schedule control unit 130, with reference to the drawings. the broadcasting schedule information map in the condition stored in the storage device 140 will be referred to as data broadcasting schedule information map for distinction.

Figure 4:
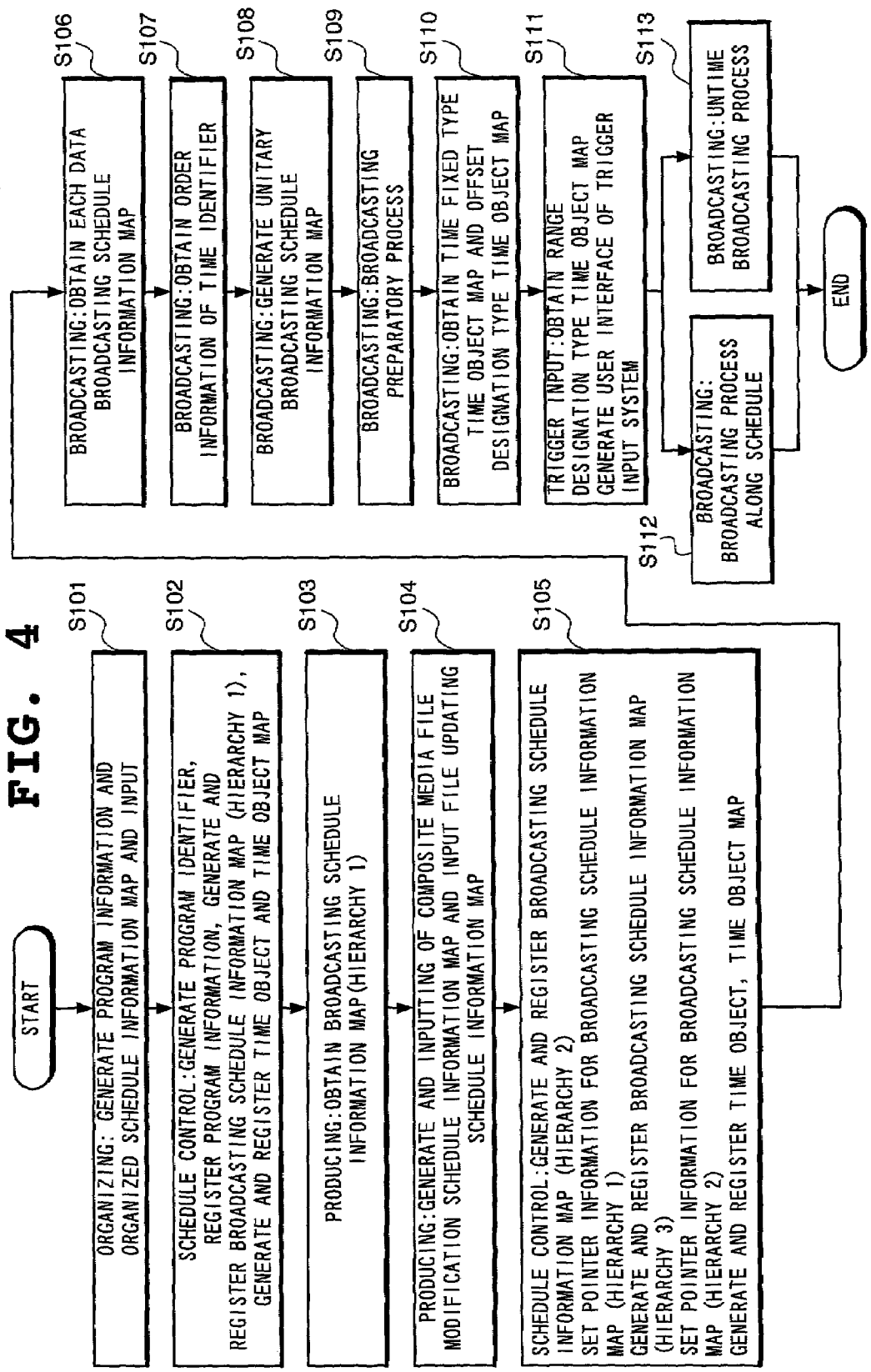
FIG. 4 is a flowchart showing a process in the first embodiment of the composite media file broadcasting program broadcasting control system according to the present invention.

FIG. 4 is a flowchart showing the broadcasting control process in respective unit in the first embodiment of the composite media file broadcasting program broadcasting control system.

Step 101:

At first, in the organizing unit 100, new program is registered. At this time, the organizing unit 100 inputs the program information and organized schedule information map to the schedule control unit 130 from the organized schedule information map input unit 101.

Here, one example of the program information is shown in FIG. 5 and one example of the organized schedule information map is illustrated in Fog. 6. In the program information shown in FIG. 5, a broadcasting station identifier (identification number of a broadcasting station), the program start timing, the program end timing, the program title and other additional information are set. In the organized schedule information map, the broadcasting start time per time frame, broadcasting continuation period, the identification number (common number for respective unit and indicative of a position of the composite media file as the object for broadcasting), kind of program/CM, the untime attribute and additional information, such as title of the time frame, explanatory character string and so forth are described. The untime attribute is a value for discriminating one having fixed broadcasting start timing in the time frame or one having the broadcasting start timing determined during on air, in which "fixed" represents that the broadcasting start timing is fixed, "offset" represents that the broadcasting start timing is determined in association with the other broadcasting start timing, "insert (1)" represents that the broadcasting data modification trigger input device 151 determines the broadcasting start timing, and "insert (2)" represents that the broadcasting data modification trigger input device 152 determines the broadcasting start timing.

Step S102:

In the schedule control unit 130, the broadcasting schedule information map registering unit 131 assigns the number to be the program identifier uniquely in the broadcasting station (in the shown case 33). With establishing correspondence of the program identifier and the program information of FIG. 5, the broadcasting start timing is stored in the program information storage portion 143. The program information to be stored is shown in FIG. 7.

Next, the broadcasting schedule information map registering unit 131 assign the time identifier unique to the program per time frame of the organized schedule information map and generates data broadcasting schedule information map (hierarchy 1) from the organized schedule information map (see FIG. 8) to store in the broadcasting schedule information map storage portion 141. The data broadcasting schedule information map is generated by replacing the broadcasting start timing of the organized schedule information map with the time identifier, removing the untime attribute for expressing by the time object map and creating a region for a point to the broadcasting schedule information map of the lower hierarchical level. In the pointer region, no value is set.

Furthermore, the broadcasting schedule information map registering unit 131 generates the time object per time frame of the organized schedule information map and generates a time object map set attribute information, such as corresponding time identifier or the like for storing in the time information storage portion 142. The time object generated at this point and the time object map are shown in FIG. 9. Kind of the time object thus generated is determined depending upon the untime attribute of the organized schedule information map. In case of "fixed", the time fixed time object is generated and the broadcasting start timing is converted into a program relative time and set. In case of "offset", the offset designation type time object is generated to set the time identifier and the offset time to be object for offset. In the shown embodiment, offset is considered as an offset from the preceding time frame. Then, in the offset designation type time object corresponding to the broadcasting start timing of the time frame (time identifier "CM-AIU" having a title of "AIU Motors", the time identifier "CM-IROHA" set at the broadcasting start timing of the time frame having a title of "IROHA Cosmetics" is set as offset objective time identifier. A broadcasting continuing period 20 seconds of the "IROHA cosmetics" is set as offset time. In case of "insert (1)" and "insert 2", the range designation type time object is generated. At this time, when the time value is set in the broadcasting start timing, the time value is considered to indicate a broadcasting target time. In the shown embodiment, a timing 10 seconds ahead of the broadcasting target time is set as start time of the time range and a timing 10 seconds after broadcasting target time is set as end time of the time range.

Step S103:

The producing unit 110 obtains the data broadcasting schedule information map (hierarchy 1) (see FIG. 8) from the broadcasting schedule information map output unit 132.

Step S104:

Next, the producing unit 110 generates the composite media file modification schedule information map corresponding to each time frame of the obtained data broadcasting schedule information map to input to the schedule control unit 130 by the composite media file modification schedule information map input unit 111. Here, the information input to the schedule control unit 130 is the file modification schedule information map, the corresponding program identifier, the time identifier corresponding to the composite media file modification schedule information map, the objective composite media file name and an objective file name. By this, the schedule control unit 130 may know connection between the broadcasting schedule information maps.

FIG. 10 shows one example of the composite media file modification schedule information map provided from the producing unit 110. The composite media file modification schedule information map represents the broadcasting schedule information map, in which the composite media file is varied significantly, namely significant visual change is caused, in the time frame of the organized schedule information map. FIG. 10 is an example of the composite media file modification schedule information map corresponding to the time identifier "Q-START" in FIG. 8. In FIG. 10, composite media file of the names, such as "opening", "introduction" and "Q1-question" and so forth per time frame is scheduled for broadcasting.

In the example of the composite media file modification schedule information map of FIG. 10, attributes consisted of the broadcasting start timing expressed by the relative time of the time frame of the organized schedule information map, the broadcasting continuing time, a production identification number, an untime attribute (used in the same meaning of organized schedule information map), the composite media file name, an explanatory character string, and constituent file list. The production identification number is a content number of the composite media file managed in the producing unit 110. Actually, in addition to these, control information necessary for broadcasting may be added. However, discussion for such additional control information will be eliminated for not essential to the present invention.

Figure 15:
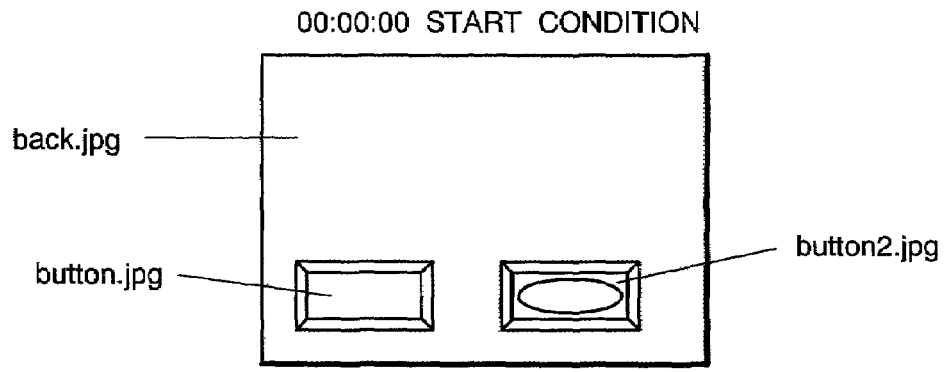
FIG. 15 is an illustration exemplifying state transition of screen when the composite media file is broadcasted along the composite media file modification schedule information map of FIGS. 11 to 14, showing start condition.
Figure 16:
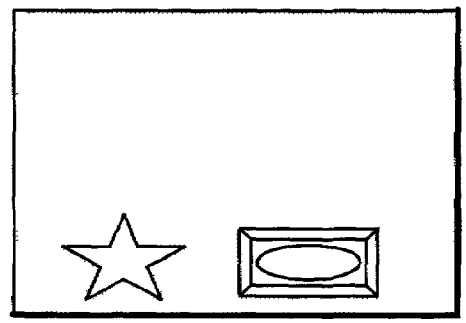
FIG. 16 is an illustration exemplifying state transition of screen when the composite media file is broadcasted along the composite media file modification schedule information map of FIGS. 11 to 14, showing button image updating.
Figure 17:
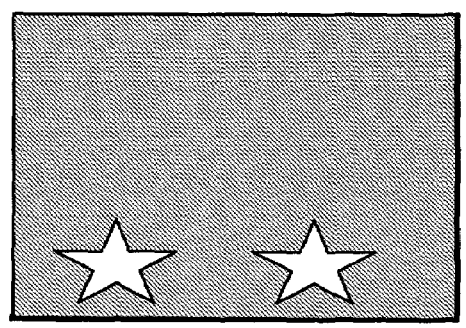
FIG. 17 is an illustration exemplifying state transition of screen when the composite media file is broadcasted along the composite media file modification schedule information map of FIGS. 11 to 14, showing background and button updating condition.

The broadcasting schedule information map input from the producing unit 110 is not only the composite media file modification schedule information map. The composite media file is consisted of a plurality of constituent files. Contents of the individual files is updated without changing the file name between the time frames of the composite media file modification schedule information. A table of the updated broadcasting schedule information is the file updating schedule information map. The file updating schedule information map will be discussed in greater detail. In the file updating schedule information map, the broadcasting start timing (expressed by a relative time in the time frame of the composite media file modification schedule information map) and file position, in which the actual content of the file started broadcasting at the relevant timing is stored, are contained. For example, in FIG. 10, when the composite media file named "Q1-question" is consisted of four files of startup. html, back.jpg, button. jpg and button2.jpg, the file updating schedule information map is present per file. One example is shown in FIGS. 11 to 14. When the composite media file is broadcasted according to the broadcasting schedule information map, after one minutes from starting broadcasting (see FIG. 15), the form of the button is varied (see FIG. 16), and after two minutes, the background image and another button are varied (see FIG. 17).

Step S105:

In the schedule control unit 130, after inputting of the composite media file modification schedule information map and the file updating schedule information map, the broadcasting schedule information map registering unit 131 assigns the time identifier unique to the program per time frame of the composite media file modification schedule information map to generate the data broadcasting schedule information map (hierarchy 2) (see FIG. 18) from the composite media file broadcasting schedule information map to register in the broadcasting schedule information map storage portion 141. At this time, to the pointer to the broadcasting schedule information map of the lower hierarchical level of the time frame to be object of the broadcasting schedule information map (hierarchy 1), the pointer information to the generated data broadcasting schedule information map (hierarchy 2) is set. A condition where the pointer is set to the data broadcasting schedule information map shown in FIG. 8 is shown in FIG. 19.

The data broadcasting schedule information map (hierarchy 2) assigns the program identifier similar to the organized schedule information map, removes the untime attribute to generate the region of the pointer to the broadcasting schedule information of the lower hierarchical level per constituent file forming the composite media file. The broadcasting start timing initially indicated in the composite media file modification schedule information map is the same as the broadcasting start timing of the time frame of the organized schedule information map. Therefore, the time identifier as the time identifier set in the organized schedule information map is set.

Next, the broadcasting schedule information map registering unit 131 generates the time object corresponding per time frame of the composite media file modification schedule information map to register in the time information storage portion 142 (wherein the time object corresponding to the initial time frame in time among the map set forth above has already generated and is not newly generated).

Subsequently, the broadcasting schedule information map registering unit 131 assigns the time identifier similar time identifier concerning the file updating schedule information map to generate the data broadcasting schedule information map (hierarchy 3) (see FIGS. 20, 21, 22 and 23) to register in the broadcasting schedule information map storage portion 141. Then, the pointer information to the registered data broadcasting schedule information map (hierarchy 3) is registered in the data broadcasting schedule information map (hierarchy 2) (see FIG. 18).

Here, when the broadcasting start timing is the same in different file updating schedule information maps, attention has to be paid in assigning the time identifier. As can be seen from FIGS. 12 and 14, back.jpg and back2.jpg have the same update timing. In such case, the same time in the different file updating schedule information maps can be realized by setting the same time identifier.

Furthermore, the broadcasting schedule information map registering unit 131 generate the time object per newly generated time identifier to register in the time information storage portion 142. Then, all time information relating to the program is registered. In this example, all registered time object map is shown in FIG. 24.

The broadcasting unit 120 performs broadcasting of the composite media file according to the program information, the broadcasting schedule information map and the time information registered in the storage device 140 in the foregoing process.

Step S106:

In the broadcasting unit 120, the unitary broadcasting schedule information map generating unit 121 obtains the all data broadcasting schedule information map relating to the program to be object for broadcasting (see FIGS, 8, 18, 20, 21, 22 and 23).

Figure 25:
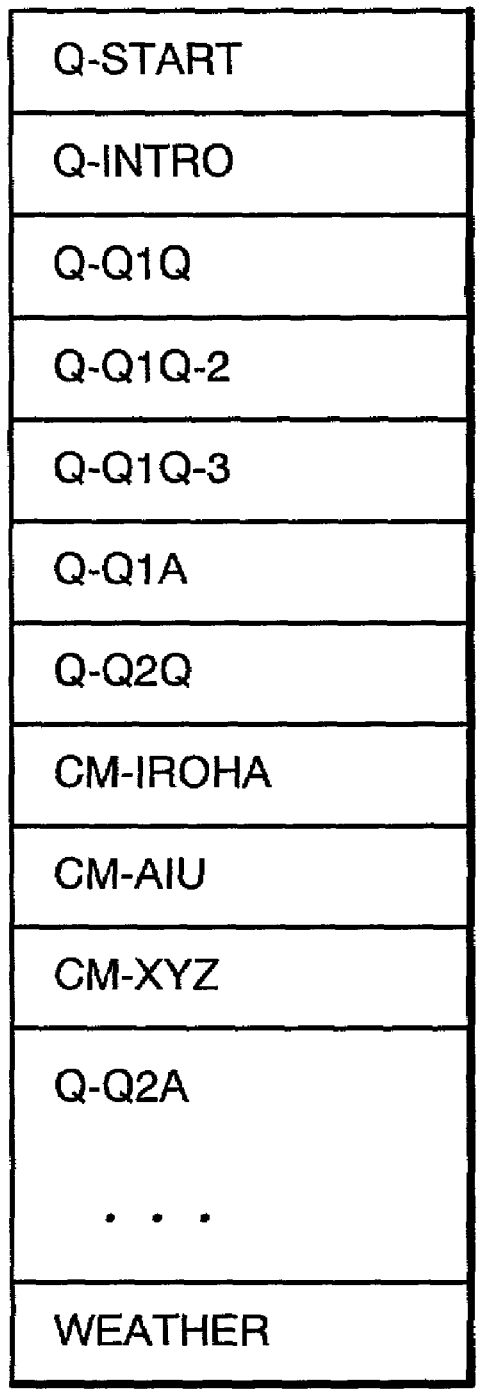
FIG. 25 is an illustration exemplifying the order information of the time identifier obtained from the schedule control unit in the first embodiment of the composite media file broadcasting program broadcasting control system according to the present invention.

Step S107:

Next, the unitary broadcasting schedule information map generating unit 121 obtains the order information of all time identifiers used in the program by the time information output unit 133 (step S107). At this time, in the schedule control unit 130, the order information is derived from the value of the time object. In case of the program handled in the shown embodiment, as shown in FIG. 24, since there is no overlapping of the time information expressed by the time object, order of all time identifier can be derived. The order information of the time identifiers obtained herein is shown in FIG. 25.

Step S108:

Subsequently, the unitary broadcasting schedule information map generating unit 121 generates the unitary broadcasting schedule information map using the data broadcasting schedule information map obtained at step S106 and the order information of the time identifier obtained at step S107. FIG. 26 shows the unitary broadcasting schedule information map generated herein. The unitary broadcasting schedule information map expresses the file position of the aggregate of the constituent files forming the composite media file and the broadcasting control information broadcasted at the timing, per time identifier sorted in order of the timing and enables broadcasting preparatory process. Here, if the context of the broadcasting start timing in the file updating schedule information map is not definite, the aggregate of the files to be broadcasted at each broadcasting start timing cannot be obtained correctly. In case of the shown example, the file updating schedule information with undetermined broadcasting start timing is present in the file updating schedule information map shown in FIG. 13. Watching the data broadcasting schedule information map (hierarchy 3) corresponding to the file updating schedule information map shown in FIG. 22, it can be appreciated that the time identifier "Q-Q1Q-2" is assigned for this timing. Furthermore, as can be seen from FIG. 24, the value set in the range designation type time object corresponding to the time identifier "Q-Q1Q-2" is that the start timing is 5'55" (5 minutes and 55 seconds) and the end timing is 6'10/ The time and the time range expressed by other time object does not overlap within a period from 5'5"" to 6'10". Therefore, order information of all time identifiers can be derived to enable generation of the unitary broadcasting schedule information map.

Step S109:

The broadcasting preparing unit 122 performs broadcasting preparatory process on the basis of the unitary broadcasting schedule information map obtained at step S108. Here, the broadcasting preparatory process is obtaining of the broadcasting file from the produced content server, processing of the broadcasting file into the broadcasting data format and generation of the broadcasting control data and so forth. In this condition, in the broadcasting unit 120, mapping of the time identifier and the broadcasting data is established.

Step S110:

Next, the broadcasting preparing unit 122 obtains the time fixed type time object map (see FIG. 27) and the offset designation type time object (see FIG. 28) from the time information output unit 133. Here, the time object maps are obtained separately per the kind of time of the time object map.

The broadcasting start timing obtained by the time fixed type time object map and the broadcasting data prepared at step S109 are mapped with the time identifier. The value of the offset designation type time object map is held since it becomes necessary during broadcasting of the program.

Step S111:

In the trigger input device 150, the broadcasting data modification trigger input device 151 obtains the range designation type time object map (see FIG. 29) as the "insert (1)" of the kind of time to display an user interface prompting trigger input of the operation based thereon (see FIG. 31). On the other hand, the broadcasting data modification trigger input device 152 obtains the range designated type time object map as "insert (2)" of the kind of time (see FIG. 30) to display an user interface prompting trigger input of the operation based thereon (see FIG. 31). In the user interface, it is possible to take a measure to permit trigger input only during the time range expressed by the time object.

Step S112:

In the broadcasting unit 120, the composite media file broadcasting unit 123 broadcasts the corresponding broadcasting data at the broadcasting time set in the time fixed type time object (see FIG. 27).

Step S113:

The broadcasting data modification trigger input device 151 and the broadcasting data modification trigger input device 152 transmits the fixed broadcasting start timing and the objective time identifier to the broadcasting unit 120 when the operator fixes the broadcasting start timing.

Figure 32:
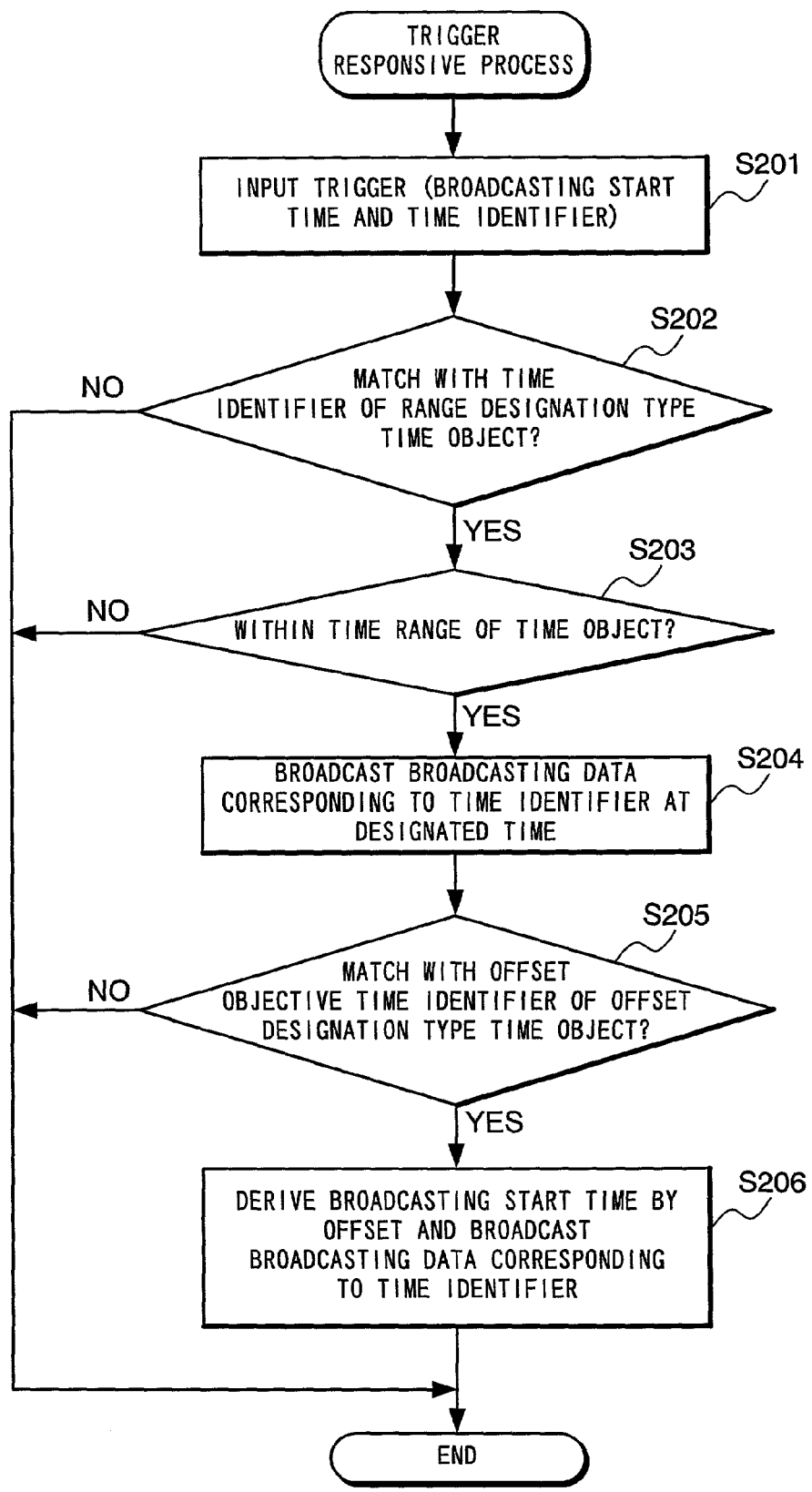
FIG. 32 is a flowchart showing a trigger correspondence process to be performed by the broadcasting unit upon receipt of trigger in the first embodiment of the composite media file broadcasting program broadcasting control system according to the present invention.

The process of the untime broadcasting process (trigger responsive process) of the broadcasting unit 120 when this information is transferred will be shown in FIG. 32.

Step S201:

In the broadcasting unit 120, the composite media file broadcasting unit 123 receives the trigger containing the broadcasting start timing and the time identifier.

Step S202:

Next, the composite media file broadcasting unit 123 checks whether the designated time identifier matches the time identifier of the range designation type time object map (see FIGS. 29 and 30) held in the broadcasting unit 120.

Step S203:

If matching time identifier is present, the composite media file broadcasting unit 123 checks whether the designated broadcasting start timing falls within the range of time of the time object.

Step S204:

If the broadcasting start timing falls within the time range of the time object, the composite media file broadcasting unit 123 performs broadcasting process of the broadcasting data corresponding to the time identified at the designated time.

Step S205:

Next, the composite media file broadcasting unit 123 checks whether the designated time identifier matches with the offset objective time identifier of the offset designation type time object map (see FIG. 28).

Step S206:

When the designated time identifier matches with the offset objective time identifier of the offset designation type time object, the composite media file broadcasting unit 123 derives the broadcasting start timing by adding the offset time to the designated broadcasting start timing to perform broadcasting process of the broadcasting data corresponding to the time identifier of the offset type time object at the derived broadcasting start timing.

The broadcasting unit 120 ignores the trigger when the foregoing condition is not satisfied.

As set forth above, the broadcasting start timing is expressed independently of the broadcasting schedule information map and provided the function for expressing the order information of the time for enabling the broadcasting preparatory process of the untime broadcasting schedule information. Therefore, the broadcasting unit 120 is quickly responsive to the trigger for the broadcasting data modification from the trigger input device 150.

With the first embodiment of the composite media file broadcasting program broadcasting control system, in the schedule control unit 130, by managing the broadcasting schedule information and the time information, time relationship between a plurality of the broadcasting schedule information in hierarchy can be expressed without depending upon real time value. By this, a plurality of broadcasting schedule information can be united into one. Furthermore, modification of the file updating schedule information in time can be easily adapted. In addition, since it maintains the form of hierarchical broadcasting schedule information, it can be adapted to exchanging of aggregates in meaning and erasure, easily. Furthermore, by providing new time values per aggregates in the meaning, it can be used in another program to improve reusing ability of the contents.

On the other hand, the time axis, on which all broadcasting schedule information presenting in one program can be expressed, is expressed by one, the time information can be obtained easily.

Furthermore, since the time information is expressed independently of the broadcasting schedule information, the broadcasting schedule information can be generated even in the condition where the time is not determined. Even in such condition, broadcasting preparatory process using only broadcasting schedule information becomes possible. On the other hand, even when the broadcasting control along the broadcasting schedule information admixed with the untime broadcasting schedule information which is determined the broadcasting start timing after starting broadcasting, there is no influence for the expressing method of the broadcasting schedule information. Therefore, adaptation to the broadcasting preparatory process or the like can be done similar to the case where all are fixed broadcasting schedule information.

Conversely, the broadcasting unit 120 can handle the fixed broadcasting schedule information and the untime broadcasting schedule information separately, and can execute the broadcasting process separately per obtained broadcasting schedule information. Furthermore, a time designation schedule table required in the trigger input device 150 designating the undetermined broadcasting start timing, can be obtained from the schedule control unit 130.

(Second Embodiment)

The second embodiment of the composite media file broadcasting program broadcasting control system according to the present invention is constructed similarly to the first embodiment of the composite media file broadcasting program broadcasting control system. Accordingly, the construction will not be discussed redundantly. In the second embodiment, similar to the first embodiment, man operates the trigger input device 150 for modification of the broadcasting data in broadcasting to perform broadcasting control of the program so that broadcasting of the modified composite media file in quickly responding to the designed broadcasting start timing. What is different in the second embodiment from the first embodiment is the order of the time object belonging in one program is not derived partially. Untime broadcasting of information in such a manner can be performed in the case where the prepared composite media file is undeterminable whether it is to be broadcasted or not or CM has to be replaced in emergency basis.

In this case, even when the context of the time objects cannot be known, it is possible that broadcasting preparatory process becomes impossible but possible in certain case. In the second embodiment, discussion will be given for a method to discriminate whether broadcasting preparatory process is possible or not and a control method for broadcasting in the case that broadcasting preparatory process is possible.

Whether broadcasting preparatory process is possible or not can be judged depending upon whether information expressing context of the broadcasting start timing in each time frame is set or not, in the file updating schedule information. Discussion will be given with example.

For example, it is assumed that a time frame no set the broadcasting target time is present at broadcasting start timing in the organized schedule information map. FIG. 33 shows one example. In FIG. 33, the organized schedule information map where title is "BB broadcasting station" and "emergency CM" expresses CM to be inserted upon emergency. Since it is not determinable when it is broadcasted in the program, the broadcasting target time is not set in the broadcasting start timing. For explanation, the composite media file modification schedule information map of "BB broadcasting station" is shown in FIG. 34, the file updating schedule information map is shown in FIGS. 35, 36 and 27. In these broadcasting schedule information map, the time frame, in which the broadcasting target time is not set in the broadcasting start timing, is not present.

Adapting to the broadcasting schedule information map exemplified in FIGS. 34, 35, 36 and 37, the data broadcasting schedule information map (hierarchy 1) stored in the broadcasting schedule information map storage portion 141 is shown in FIG. 38. The data broadcasting schedule information map (hierarchy 2) is shown in FIG. 39, the data broadcasting schedule information map (hierarchy 3) is shown in FIGS. 40, 41 and 42. Such information format is nothing different from the first embodiment. In the time object map (see FIG. 43) stored in the time information storage portion 142, two range designation type time objects are present set the start timing 00:00:00 and end timing at program end timing 01:00:00. In the second embodiment, the range designation type time object set the program start timing and the program end timing expresses the broadcasting start timing of the untime broadcasting schedule, start timing of which is not known.

The broadcasting unit 120 can be judged whether broadcasting preparatory process from the broadcasting schedule information map and the time object map can be performed. In the time object map shown in FIG. 43, the time object expressing the time, start timing of which is not known, is the time object having time identifier of "CM-BB" and "CM-GOV". Since the manager of the these time identifiers are organizing unit 100 and it is not the updating timing of the file updating schedule information, it can be appreciated that broadcasting preparatory process is possible. When the manager of the time object expressing the undetermined timing for broadcasting is the time identifier appearing only in the data broadcasting schedule information map (hierarchy 3), is the producing unit 110, broadcasting preparatory process is impossible.

In the broadcasting preparatory process, the order information of the time identifier is required. Here, the order information of the time identifier is output as a list (see FIG. 44) of the time identifier known the order shown in FIGS. 44, 45 and 46 and as a list (see FIGS. 45 and 46) of the time identifier order of which is not known. The order information of the time identifier not known the order is obtained in a form of a list of the time identifier not known the order and the time identifier (if any) of the offset designation type time object taking that time identifier as offset object/

In the shown example, the time identifier "CM-BB" and "CM-GOV" are not known the order in the overall schedule but are timing not expressing the file updating timing of the file updating schedule information. Therefore, obtaining of aggregate of the files of the composite media file started broadcasting at that timing becomes possible. Accordingly, generation of the unitary broadcasting schedule information map shown in FIG. 47 becomes possible. By performing broadcasting preparatory process based thereon, broadcasting according to the fixed broadcasting start timing and broadcasting according to designation of the broadcasting data modification from the trigger input device 150 can be realized in similar manner as the first embodiment.

(3) Third Embodiment

In the shown embodiment, three kinds of time objects of the time fixed type, the range designation type and offset designation type shown by (b-1) to (b-3) of FIG. 3 performing broadcasting of the program realizing broadcasting schedule information using four kinds of the time object by adding association type time object.

At first, discussion will be given for the kind of programs to be enabled by each time object. Then, time order judgment method of the time object will be discussed. If judgment of order of the time objects becomes possible, capability of broadcasting control in the similar manner as the first and second embodiment can be proven.

FIG. 48 shows a data construction of the association type time object. The association type time object expresses one point in a range from a timing derived by adding a value set in "start relative time" to the time object having identifier set in "association objective time identifier" to a timing of the time value or time object having the time identifier designated in "end timing or time identifier".

By employing four kinds of time objects, the following broadcasting schedule information of the program can be expressed. Broadcasting control of the program becomes possible:

a. data broadcasting program all screen varying timing being fixed;
b. data broadcasting program, for which trigger being applied from the trigger input device 150 between a certain time range to change screen image;
c. data broadcasting program change of screen image being taken place after a given period from certain trigger; and
d. data broadcasting program change of screen image being taken place when trigger is applied from trigger input device 150 within a time range after a given period from a certain trigger and before a certain timing; and
e. data broadcasting program in which four kinds of screen image modification of a, b, c and d are present in admixing manner.

a represents the program, in which modification of screen image in the program is taken place at all fixed timing. As the time object for such program, only one kind of the time fixed type time object is employed as the time object.

b represents the program, in which modification of the screen image is taken place at a fixed timing or in response to the trigger. As the time object relating to this program, two kinds of time objects, i.e. time fixed type time object and the range designation type time object are employed.

c represents the program, in which modification of screen image in the program is taken place at fixed timing, in response to the trigger or automatically after a given period from trigger timing. As the time objects, three kinds of time objects, i.e. the time fixed type time object, the range designation type time object and the offset designation type time object are employed.

The following is particular example. When a set of commercial messages started at the timing of trigger and broadcasting period of each commercial message is 15 seconds, start timing of the first commercial message is determined using the range designation type time object. Start timings of the second and subsequent commercial messages are determined using the offset designation type time object As the offset objective time identifier of the offset designation type time object, the identifier of the time object employed for the start timing of the first commercial message is set. As the offset period, values of 15 seconds, 30 seconds and so forth are set.

d represents the program, in which modification of the screen image performed relative to other modification of the screen image. As the time object relating to this program, three kinds of time objects, i.e. the time fixed type time object, the range designation type time object and the association type time object are employed.

As particular example, the question contents and answer contents in quiz program. When both of the question contents and the answer contents are started to display by the timing of trigger, it expresses that the answer content must not be displayed before the question contents. Therefore, as the time object for the answer contents, the association type time object is employed. As the association objective time identifier of the association type time object, the identifier of the time object to be employed for the display start timing of the question contents is set. The start relative time is set for a period to maintain the question content on the display. Furthermore, as the end timing, a time limit to display the answer content or the time identifier expressing the display start timing of the next question content is set, for example.

e represents the program, for which four kinds of time objects, i.e. the time fixed type time object, the range designation type time object, the offset designation type time object and the association type time object.

What is subject to broadcasting control in the shown embodiment is the program e. The program e uses all of four kinds of time objects. A system which can perform the broadcasting control for program e can perform broadcasting control for all programs of a to e.

Figure 49:
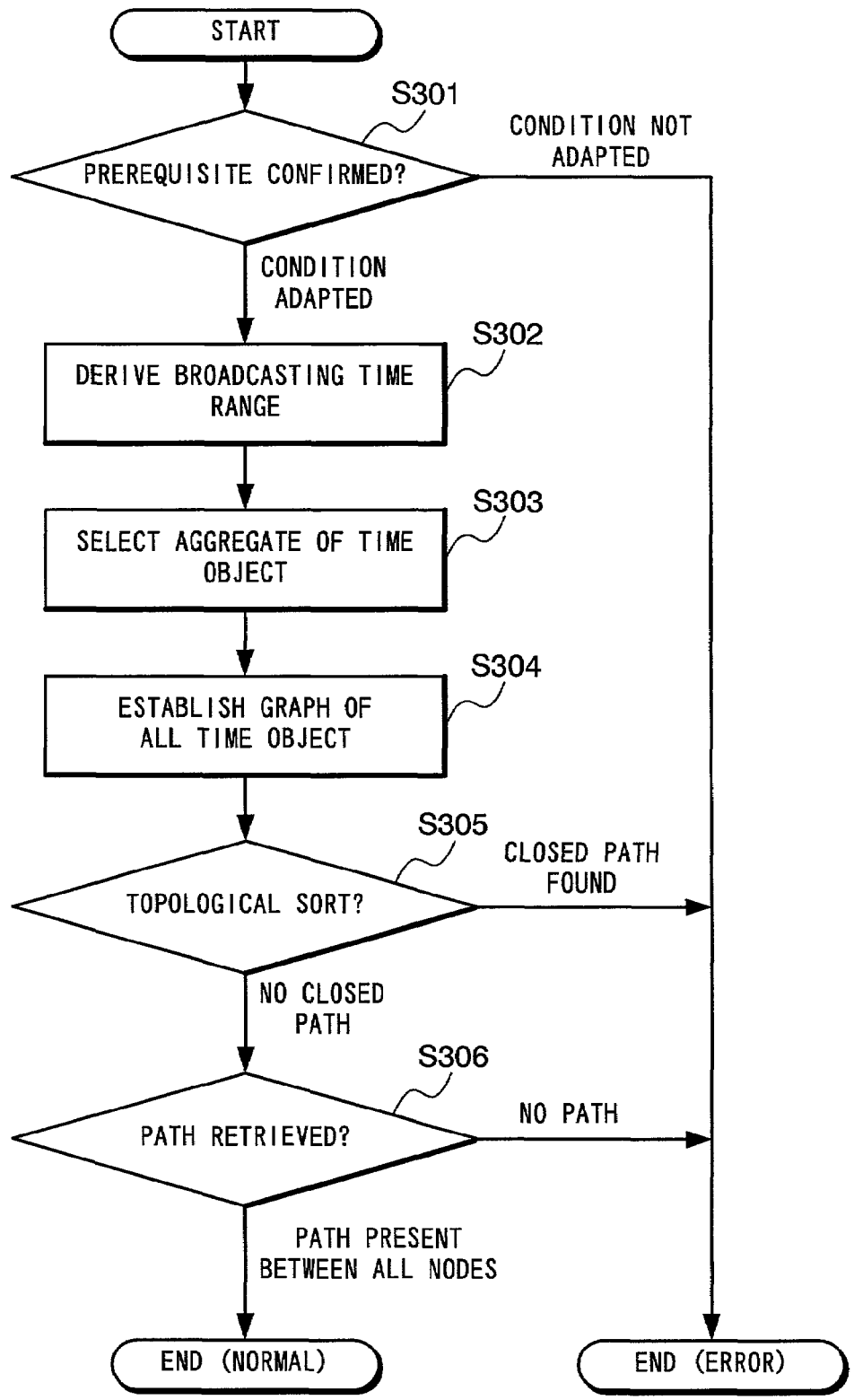
FIG. 49 is an illustration showing a flow of the order judgment process of the time object in the third embodiment of the composite media file broadcasting program broadcasting control system according to the present invention.

Discussion will be given in detail for the order judgment process of the aggregate of the time objects by the time information output unit 133 in the schedule control unit 130 when the foregoing four kinds of time objects are present in admixing manner. For judgment "Topological Sorting Theory" (see "C-data Structure and Program" written by Lender Ammeraal, translated by Hironori Koyama, Chapter 8, Ohme K. K.) may be applicable. Flow of the order judgment process is as shown in FIG. 49. The order judgment process is performed for all of time objects belonging in the objective program to be broadcasted.

Step S301:

The time information output unit 133 checks whether the time object satisfies prerequisite for performing order judgment.

Here, the prerequisite is as follows:

1. There is no other time object expressing the same timing as the certain time fixed type time object.
2. When the time identifiers are used for the start time and end time of the range designation type time object, the time objects corresponding to the time identifiers present in the aggregate of the time objects to be object of the order judgment process.

3. The time object corresponding to the offset objective time identifier of the offset designation type time object presents in the aggregate of the time objects to be object of the order judgment process.
4. The time object corresponding to the association objective time identifier of the association type time object, presents in the aggregate of the time objects corresponding to the time identifier.
5. When the time identifier is used for the end time of the association type time object, the time object corresponding to the time identifier presents in the aggregate of the time objects to be object of the order judgment process.

When the time object not corresponding to any one of the conditions is present, the time information output unit 133 terminates the process with judgment that the program is not possible to make judgment of order.

Step S302:

When the aggregate of the time objects to be object comply with all prerequisites, the time information output unit 133 derives the broadcasting time range of each time object. This indicates replacement of the range to be determined the time with the expression of the real time value.

Derivation of the broadcasting time range (start time to end time) of each time object is performed in partially recursive manner as follow.

In case of the time fixed type time object, the expressed real time value (program relative time) becomes the start time and the end time.

In case of the range designation type time object, the broadcasting time range of the time object corresponding to the offset objective time identifier is derived (recurring), the offset time is added to convert into the real time value.

In case of the association type object, the broadcasting time range of the time object corresponding to the association objective time identifier is derived (recurring) to obtain start time by adding the start relative time to the obtained start time. If the end time is the real time value, it becomes the end time as is. If the end time is the time identifier, the end time is obtained by recurring process.

Here, in case of the aggregate of the time objects satisfying the prerequisite, the recurring process may not fall into endless loop. All time objects have attribute of start time to end time by the foregoing process.

Step S303:

The time information output unit 133 selects an aggregate of the time objects to be sorted in order. This condition is designated using the entry value of the time object map shown in FIG. 2. The subsequent process is performed for the aggregate of the time objects adapting to the designated condition.

Step S304:

The time information output unit 133 establishes a graph of the aggregate of the time objects. The graph is a directed graph. Establishing of the graph is performed as follow.

1. Node corresponding to each time object and the real time value set in the broadcasting time range of the time object.
2. Node establishes links for all nodes having greater value than own value. For example, when the time identifier LABEL1 is set for the start time of the range designation type time object α, the time identifier LABEL2 is set for the end time, and the start time of the broadcasting range derived at step S302 is 0:00 and the end time is 0:30, to the node of α, link is established from nodes of the time objects corresponding to 0:00 and LABEL1. From the node of α, link is established to respective nodes of the time objects corresponding to 0:30 and LABEL2. It should be noted that, in the node corresponding to the real time value, link is not established between all nodes but established with only nodes having adjacent values.

Step S305:

If links are established with all notes, the time information output unit 133 performs topological sort. An output of the topological sort is an output of order (referred to as topological order which is not contradictory with presence or absence of closed path and direction of the link.

Closed path unit closing of links. When nodes are α, β and γ, links are established from α to β, β to γ and γ to α. The links thus established expresses order of the time. Therefore, presence of the closed path represents that the nodes are not aligned.

Accordingly, when the closed path is present, the time information output unit 133 makes judgment that the program is impossible to make judgment of order and terminates the process.

Step S306:

However, even when closed path is not present, a plurality of topological orders may be present. For example, this is the case where the link is established from 0:00 and two nodes linked to 0:20 are present. In this case, while closed path is formed, two topological orders are present and order between two nodes cannot be determined.

Since the topological order corresponds to the order of the time objects, it represents that the order of the time objects cannot be determined univocal manner. Here, in order to derive univocally determined time object, for confirming that order of the nodes as the time objects is determined univocally among topological order obtained at step S305, the time information output unit 133 performs path retrieval in the graph. Among order of the nodes obtained by the topological sort, nodes corresponding to the time object are extracted to retrieve presence or absence of the route (route between the nodes tracing the link) between adjacent nodes. When the path is not present, it represents that a plurality of topological orders are present. According, the time information output unit 133 terminates the process with making judgment that the program is not possible to make judgment of the order.

When paths are present for all of adjacent nodes, the time information output unit 133 outputs the obtained order of the nodes as time order of the time objects to terminate the process.

As set forth above, in the program having all of four kinds of time objects, order of the time objects can be judged. Here, when the order can be fixed univocally, broadcasting control of the program can be performed in similar manner as the first and second embodiments.

In the schedule control device 130, concerning operation of the broadcasting unit 120 performing broadcasting of the program which is judged that judgment of order of the time object is not possible, discussion will be given in the following fourth embodiment.

(4) Fourth Embodiment

Figure 50:
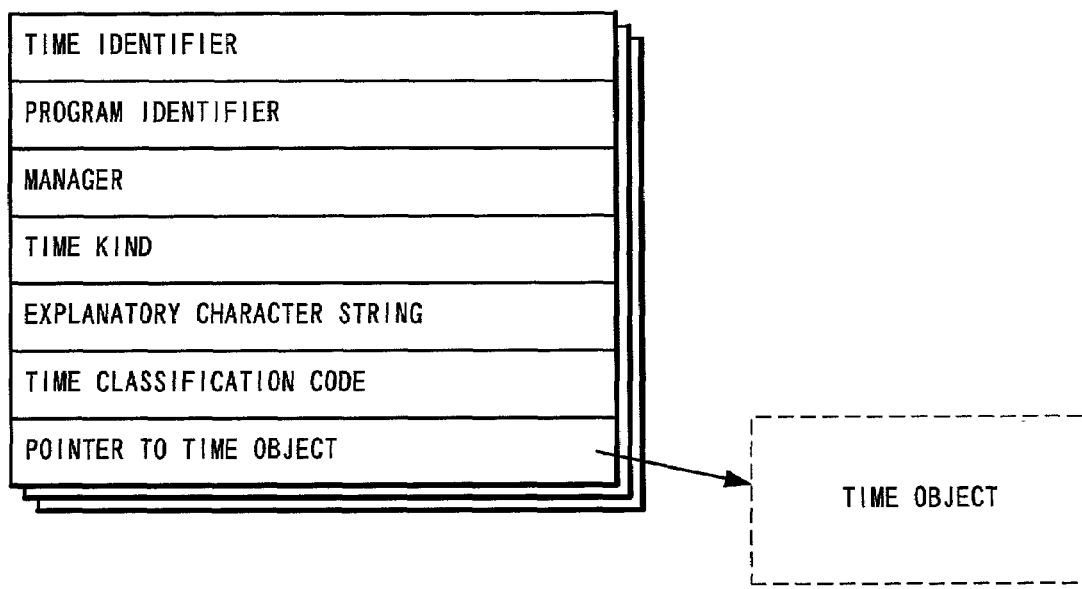
FIG. 50 is an illustration showing a data structure showing an association type time object to be used in the fourth embodiment of the composite media file broadcasting program broadcasting control system according to the present invention.

In the shown embodiment, consideration is given for the case where each entry of the time object map is as shown in FIG. 50. In this case, comparing the case of FIG. 2, "time classification code", as attribute value of the time object is added.

The time classification code is used for dividing the program broadcasting time into several time segments. For example, for the program from 7:00 to 8:00, the time classification code 1 is assigned from 7:00 to 7:20, the time classification code 2 is assigned from 7:20 to 7:40, and the time classification code 3 is assigned from 7:40 to 8:00. Then attribute values 1, 2 and 3 of the time objects belonging in respective time segments are assigned.

Upon obtaining time object map and the order information of the time object from the schedule control unit 130, it becomes possible to obtain only time objects having the same time classification code as the attribute value. Here, the value of the time classification code is ruled to assign greater value for later timing.

In the schedule control unit 130, a function for selecting an aggregate of the time objects to perform broadcasting control using the time classification code is provided. Accordingly, the broadcasting unit 120 divides one program into several time segments for performing broadcasting process (see step S303). By this, even when the time objects "order judgment is possible" and "order judgment is impossible" are present in admixing manner, broadcasting becomes possible.

Figure 51:
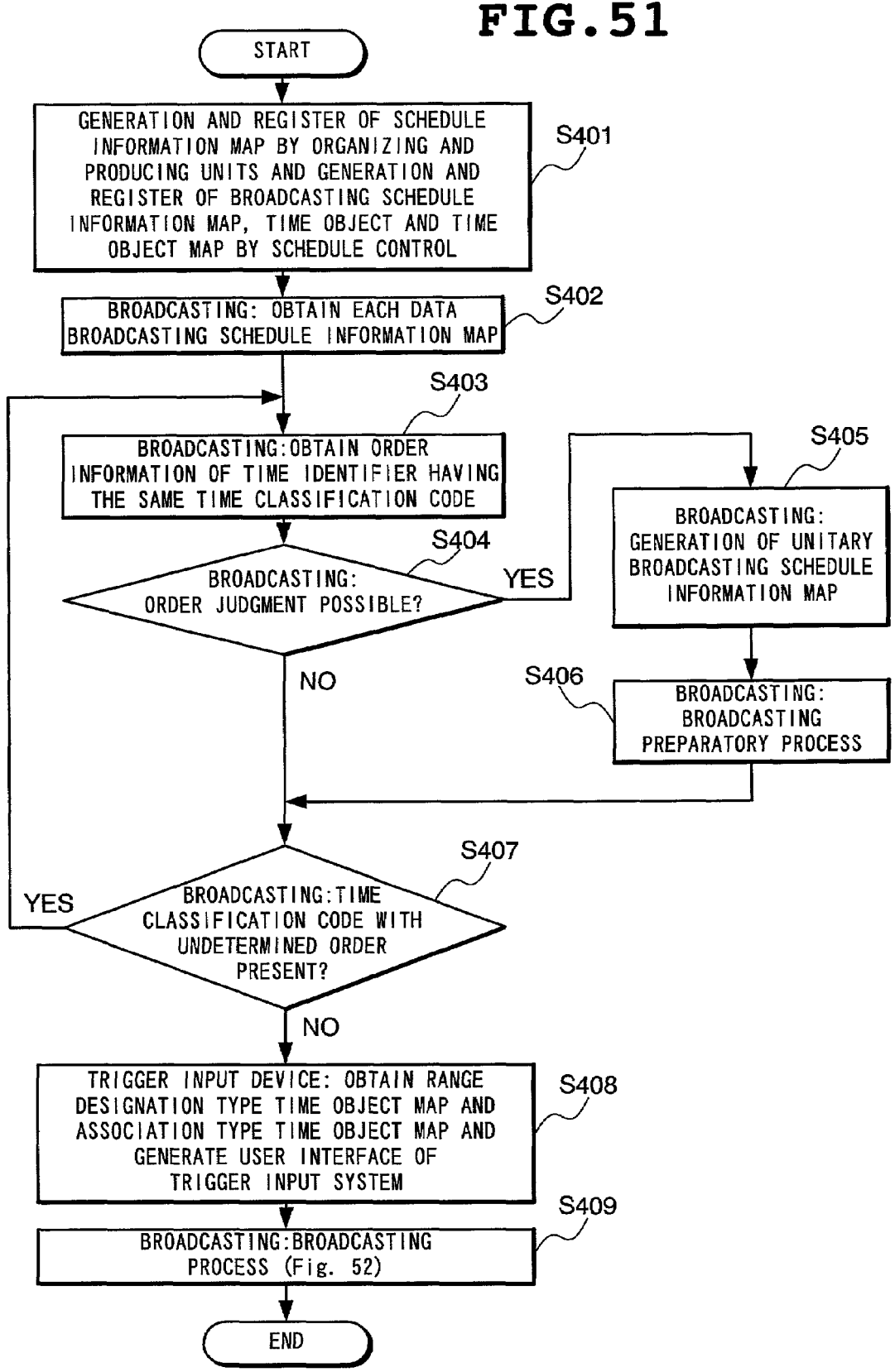
FIG. 51 is a flowchart showing a process in the fourth embodiment of the composite media file broadcasting program broadcasting control system according to the present invention.

In this case, flow of the broadcasting control process in each unit is as shown in FIG. 51.

Step S401:
Generation and registering of the schedule information map by the organizing unit 100 and the producing unit 110, and generation and registering of the broadcasting schedule information map, the time object and the time object map corresponding to the registered schedule information map by the schedule control unit 130 are performed. This is the same process as steps S101 to S105 (see FIG. 4) in the first embodiment.

Step S402:
The broadcasting unit 120 obtains all of the data broadcasting schedule information map relating to the program to be object for broadcasting. This is the same process as the step S106 (see FIG. 4) in the first embodiment.

Step S403:
The broadcasting unit 120 obtains the order information of the time identifier having the same time classification code.

Step S404, S405, S406:
When the judgment is made that judgment of order of the time identifiers can be made, the broadcasting unit 120 generates the unitary broadcasting schedule information map on the basis of the obtained order information to perform broadcasting preparatory process. These processes are the same processes as steps S107 to S109 (see FIG. 4). When judgment is made that the judgment of order of the time identifier is not possible, the broadcasting unit 120 does not perform broadcasting preparatory process.

Step S407:
The broadcasting unit 120 respectively performs the processes at steps S404, S405 and S406 for all time classification codes.

Step S408:
The trigger input device 150 obtains the range designation type time object map and the association type time object map from the schedule control unit 130 to generate the user interface of the trigger input system.

Step S409:
After completion of all processes set forth above, the broadcasting unit 120 performs broadcasting process.

Flow of the broadcasting process at step S409 will be discussed with reference to FIG. 52.

Step S501:
A time of certain time object is fixed. When the time of the range designation type time object or the association type object is fixed by the trigger input, or δ minutes before the designated time of the time fixed type time object, the process is initiated. δ is a unique value of the broadcasting unit 120 which is set slightly greater value than that required in modification of the broadcasting data.

Step S502, S503:
Concerning the time object to be object, if not preparation for broadcasting is not completed, the unitary broadcasting schedule information map generating unit 121 generates the unitary broadcasting schedule information map of the time object having the same time classification object as the time object in question (see Step S108). Here, when the range designation type time object and the association type time object, for which the time is not fixed, is present, such time object is excluded.

Step S504:
The broadcasting preparing unit 122 performs broadcasting preparatory process of the objective time object using the unitary broadcasting schedule information map thus generated.

Steps S505, S506, S507:
When fixing of the time at step S501 is made in response to the trigger input, the composite medial file broadcasting unit 123 performs a trigger responding process through the process shown in FIG. 32. Otherwise, the broadcasting data generated through the broadcasting preparatory process is broadcasted at the designated time.

Step S508:
The foregoing process is continued up to end of the program.

As set forth above, if the time zone where the order of screen image modification in one program is fixed and time zone where the order is not fixed are present, by assigning the different time classification codes for respective time zones, broadcasting preparatory process can be performed before broadcasting of the program for the time zones with fixed order, and broadcasting preparatory process is performed after fixing of the time in the time zones with not fixed order.

By performing the broadcasting preparatory process before starting program, broadcasting data can be modified instantly after fixing the time. Namely, it becomes possible to perform broadcasting control instantly responding to instruction of a person managing the progress of the program (program director). In contrast to this, when the broadcasting preparatory process cannot be performed, a time lag in a period corresponding to generation period of the broadcasting data can be caused. With utilizing the time classification code, even when portion where the order of the time object cannot be fixed as a part of the program, it can be avoided to make whole program becomes impossible to subject to preparation process for broadcasting.

(5) Fifth Embodiment

In the shown embodiment, discussion will be given for broadcasting control method for the case where when the broadcasting schedule information map output unit 132 is extended in the schedule control unit 130. The broadcasting schedule information map output unit 132 is provided with a function for outputting the data broadcasting schedule information map associated with the program as required. By extension, the broadcasting schedule information map output unit 132 is provided with a function for outputting data broadcasting schedule information map in each hierarchical level corresponding to the time identifier required. In he embodiment not provided such function, the broadcasting unit 120 units the aggregate of the time object obtained from the time information output unit 133, their order and the data broadcasting schedule information map under the time identifier as common item to generate the unitary broadcasting schedule information map to perform broadcasting preparatory process. In the shown embodiment, broadcasting preparatory process can be performed without generating the unitary broadcasting schedule information map.

Figure 53:
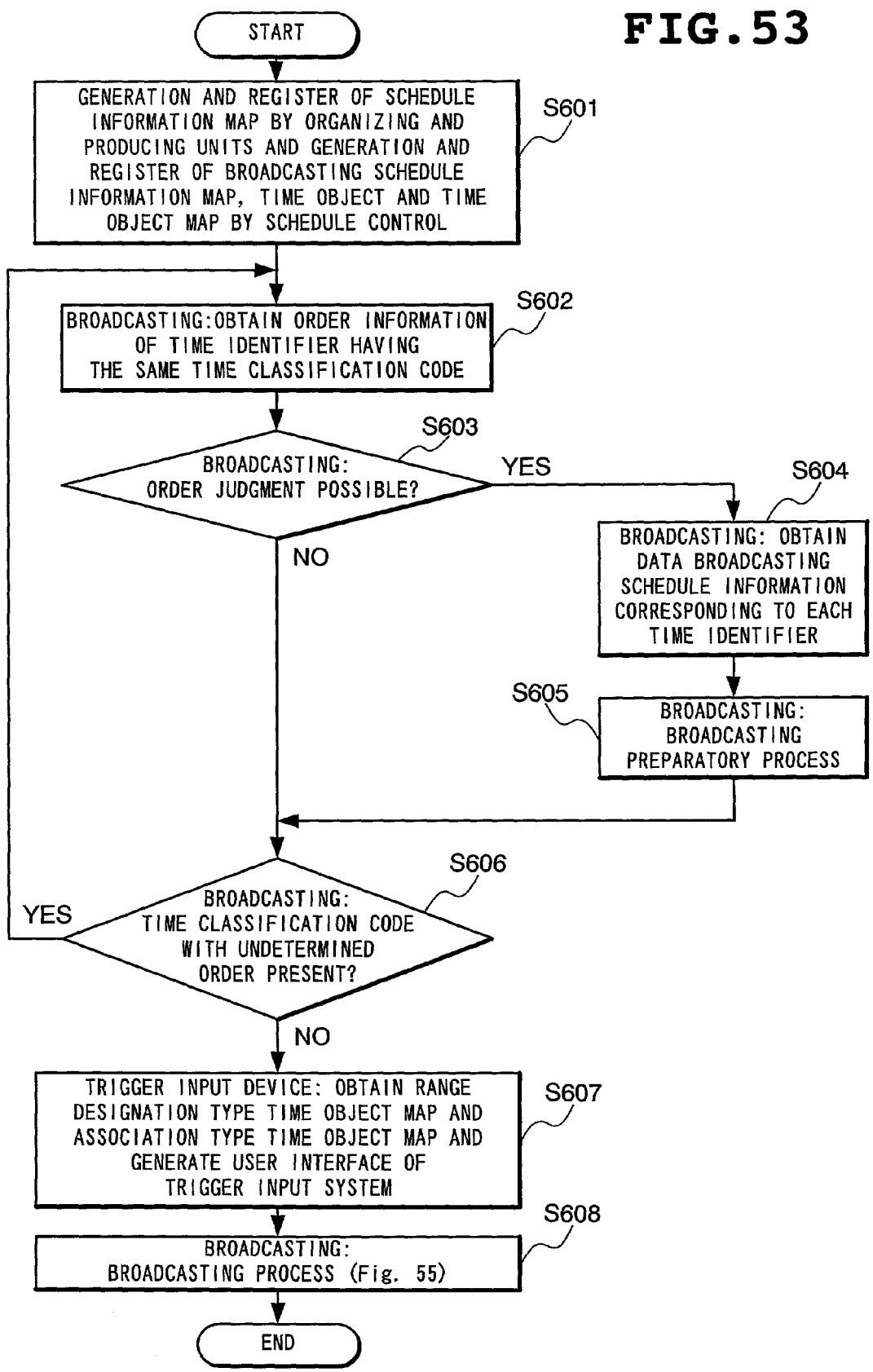
FIG. 53 is a flowchart showing a trigger input process of the broadcasting unit in the fourth embodiment of the composite media file broadcasting program broadcasting control system according to the present invention.

Flow of the broadcasting control process in the shown embodiment will be discussed with reference to FIG. 53.

Step S601:

Generation and registering of the broadcasting schedule information map by the organizing unit 100 and the producing unit 110 and generation and registration of the data broadcasting schedule information map, the time object and the time object map corresponding to the registered broadcasting schedule information map are performed. These are the same processes as those at steps S101 to S105 (see FIG. 4) in the first embodiment.

Step S602:

In the broadcasting unit 120, the unitary broadcasting schedule information map 121 obtains the order information of the time identifier having the same time classification code from the time information output unit 133 in the schedule control unit 130.

Step S603, S604:

When judgment is made that judgment of the order of the time identifier, the unitary broadcasting schedule information map generating unit 121 provides the order information of the time identifier to the broadcasting schedule information map output unit 132 of the schedule control unit 130 for obtaining the data broadcasting schedule information corresponding to each time identifier.

For example, the data broadcasting schedule information map stored in the schedule control unit 130 are shown in FIGS. 18, 19 and 20 to 23. When the time identifiers are ordered as "Q-Q1Q", "Q-Q1Q-2", "Q-Q1Q-3", the broadcasting schedule information map output unit 132 in the schedule control unit 130 outputs the data broadcasting schedule information shown in FIG. 54 for the program identifier "33" and the time identifier "Q-Q1Q-2". Here, per the data broadcasting schedule information map at each hierarchical level, if the data broadcasting schedule information corresponding to the time identifier "Q-Q1Q-2", the information corresponding to that time identifier is output. On the other hand, if the data broadcasting schedule information corresponding to the time identifier is not present, the data broadcasting schedule information corresponding to the preceding time identifier closest to the time identifier "Q-Q1Q-2" in time order, is output. The data broadcasting schedule information this obtained is all data broadcasting schedule information necessary for generating the broadcasting data to be broadcasted at the timing identified by the time identifier "Q-Q1Q-2".

Step S605:

The broadcasting preparing unit 122 performs broadcasting preparatory process on the basis of the data broadcasting schedule information obtained at step S604. The broadcasting preparatory process referred herein is obtaining of the broadcasting file from the produced content server, processing of the broadcasting file into the broadcasting data format and generation of the broadcasting control data. At this condition, in the broadcasting unit 120, mapping of the time identifier and the broadcasting data can be established.

Step S606:

The broadcasting unit 120 performs process at steps S603, S604, S605 for all time classification codes, respectively.

Step S607:

The trigger input device 150 obtains the range designation type time object and the association type time object and generates a user interface of the trigger input system.

Step S608:

After completing the foregoing process, the broadcasting unit 120 performs the broadcasting process.

Figure 55:
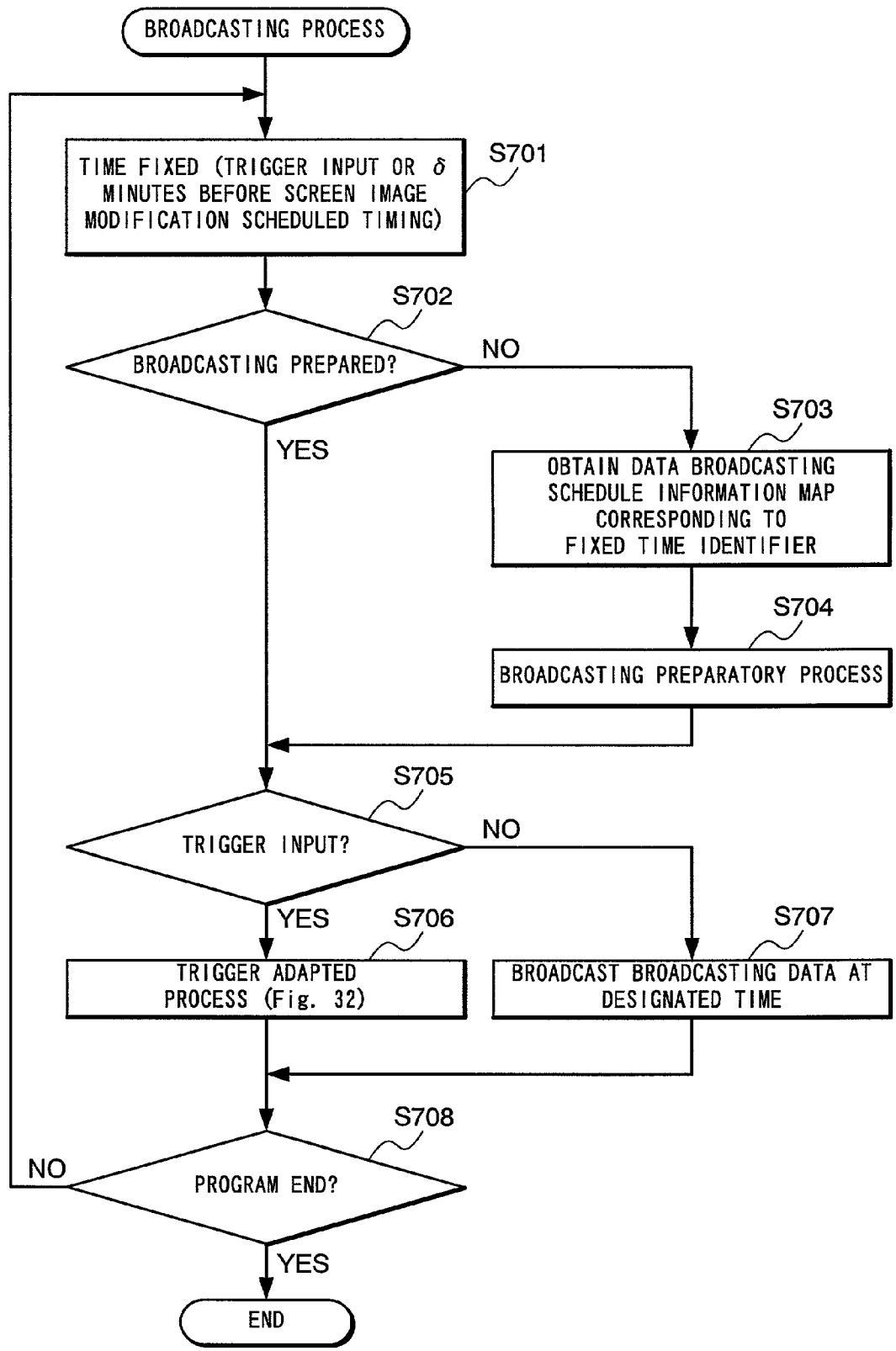
FIG. 55 is a flowchart showing broadcasting process of the broadcasting unit in the fifth embodiment of the composite media file broadcasting program broadcasting control system according to the present invention.

The flow of the broadcasting process at step S608 will be discussed with reference to FIG. 55.

Step S701:

A time of certain time object is fixed. This corresponds to the timing where the time of the range designation type time object or the association type time object is fixed by trigger input or δ minutes before the designated timing of the time fixed type time object. δ is normally set at slightly greater value than a period required for modification of the broadcasting data and is unique value of the broadcasting unit 120.

Step S702, S703:

Concerning objective time object, if broadcasting preparation is not completed, the unitary broadcasting schedule information map generating unit 121 takes the time identifier of the time object and the order information of the time identifier currently fixed to obtain the data broadcasting schedule information corresponding to the time identifier from the schedule control unit 130.

Step S704:

The broadcasting preparing unit 122 generates the broadcasting data corresponding to the fixed time identifier from the obtained information (broadcasting preparatory process).

Steps S705, S706, S707:

When fixing of the time at step S701 is made by trigger input, the composite media file broadcasting unit 123 performs trigger responding process through the process shown in FIG. 32. Otherwise, the broadcasting data generated in the broadcasting preparatory process at the designated time is broadcasted.

Step S708:

The foregoing process is continued up to the end of the program.

By the foregoing, broadcasting control in a manner that broadcasting preparatory process is performed without generating the unitary broadcasting schedule information map in the broadcasting unit 120.

(6) Sixth Embodiment

In the shown embodiment, the broadcasting unit 120 has a function for designating number of candidates of the obtained order for the schedule control unit 130. Furthermore, in the time information output unit 133 of the schedule control unit 130, the order judgment process of the time identifier is slightly differentiated from that of the third embodiment to perform output even if a plurality of candidates are present but the number of candidates falls within the designated candidate number.

When a plurality of number of candidates of the order of the time identifier are obtained, the broadcasting unit 120 performs the broadcasting preparatory process for all candidates to perform broadcasting process with selecting the one having corresponding order from a plurality of broadcasting data when the order is fixed by the trigger input device 150.

By this, even when time objects of the broadcasting schedule information generated by the organizing unit 100 and the producing unit 110 is not ordered univocally, the broadcasting preparatory process is performed before starting of program if number of combination falls within the given number. After trigger timing. the broadcasting data can be broadcasted instantly.

Figure 56:
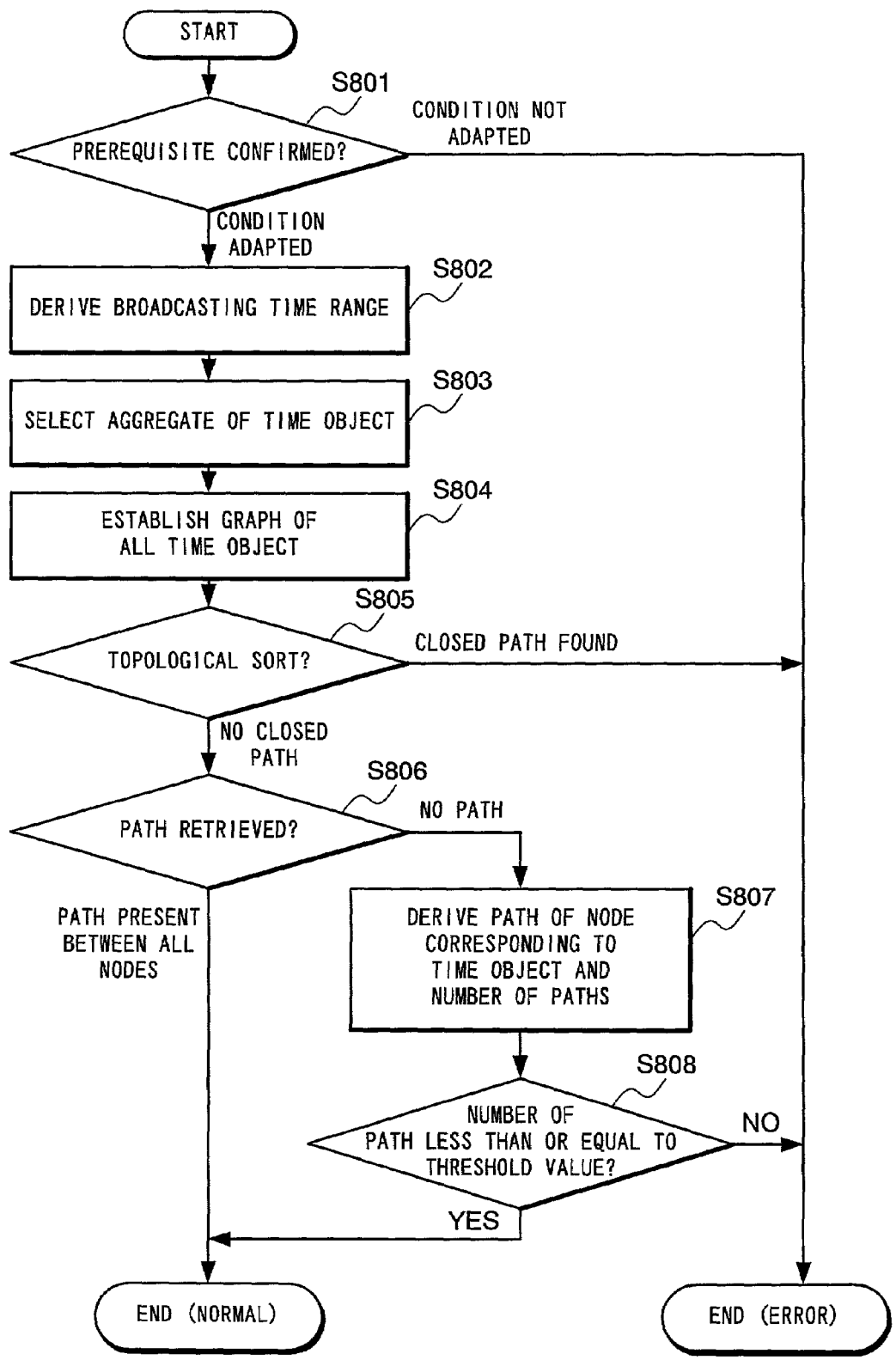
FIG. 56 is a flowchart showing a order judgment process of time object of the schedule control unit in the sixth embodiment of the composite media file broadcasting program broadcasting control system according to the present invention.

FIG. 56 shows a procedure of the order judgment process of the time identifier in the time information output unit of the schedule control unit 130. Steps S801 to S806 are similar to steps S301 to S306 (see FIG. 9) in the fourth embodiment.

Step S807:

When the nodes corresponding to the time objects are not arranged in alignment, the time information output unit 133 is obtains the candidate of the order.

This process corresponds to obtaining of all topological orders. Accordingly, all candidates are obtained by repeating topological sorting process.

At first, graph excluding nodes corresponding to the real time values are generated. Next, graph retrieval is performed in the topological sort one by one without passing the route which is passed once. When all routes are passed, the process is terminated.

A plurality of topological order thus obtained are candidates of the order of the time object.

Step S808:

When number of candidates of the order of the time objects obtained at step S807 is less than or equal to input threshold value, all paths (namely all possible orders of the time objects) are output. If number of number of paths is greater than the threshold value, judgment is made that order judgment cannot be made to terminate the process.

Through the foregoing process, one or more kinds of order of the time objects are derived.

The procedure of the broadcasting control process in the shown embodiment is substantially the same as the procedure shown in FIG. 51. When a plurality of order information of the time object are obtained, the process of the steps S405, S406 of the broadcasting unit 120 is performed for number of times corresponding to obtained number of kinds. The broadcasting data corresponding to each kind are stored in the broadcasting unit 120.

Figure 52:
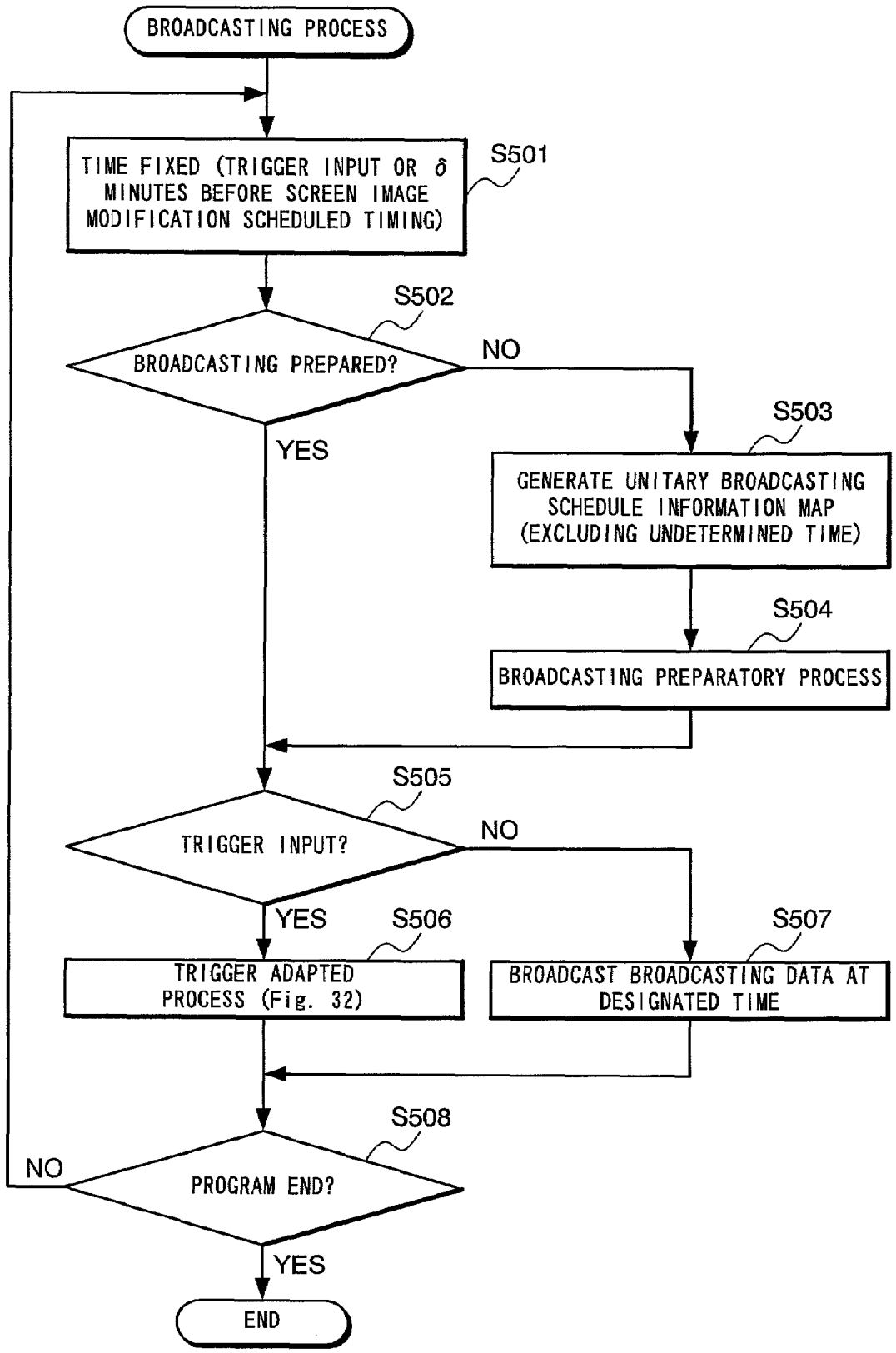
FIG. 52 is a flowchart showing a broadcasting process in the broadcasting unit in the fourth embodiment of the composite media file broadcasting program broadcasting control system according to the present invention.

The broadcasting process in the broadcasting unit 120 is substantially the same as the procedure shown in FIG. 52. When a plurality of times of order information of the time objects are obtained, upon fixing of the time at step S501, retrieval is performed whether the broadcasting data corresponding to the fixed order is stored in the broadcasting unit 120 at a timing where the time is fixed at step S502. If the corresponding broadcasting data is present, the corresponding broadcasting data is broadcasted. Otherwise, broadcasting preparatory process is performed at the fixed timing to broadcast the generated broadcasting data.

In the foregoing procedure, even for the program, in which the order of the time object cannot be determined univocally, if the kinds of order information is less than or equal to the threshold value, broadcasting can be performed instantly in response to the trigger.

According to the present invention, the following effects can be obtained.

Firstly, a broadcasting unit may attain an aggregate of constituent files of a composite media file per time identifier and can perform broadcasting preparatory process from a condition where fixed broadcasting start timing is not obtained by using order information of the time identifier and hierarchically presenting plurality of data broadcasting schedule information maps. Namely, even with the broadcasting schedule information map, in which the untime broadcasting schedule information of undetermined broadcasting start timing is present in admixing manner. broadcasting preparatory process can be performed as long as the order of the broadcasting start timing is fixed. Therefore, broadcasting can be performed instantly in response to determination of the broadcasting start timing.

Secondly, the composite media file broadcasting program broadcasting control system enables expressing the broadcasting schedule information map where an untime broadcasting schedule information is present even when the untime broadcasting schedule information order of the broadcasting start timing is unknown, to permit judgment whether the broadcasting preparatory process is possible or not and whereby to enable broadcasting preparatory process when the broadcasting schedule information map in higher hierarchy is present.

Thirdly, the composite media file broadcasting program broadcasting control system can derive the broadcasting start timing without tracing the hierarchy of the broadcasting schedule information maps by separately holing a plurality of data broadcasting schedule information maps for which real time values are not set and the time information which can be expressed independently and linearly.

Fourthly, the composite media file broadcasting program broadcasting control system can realize shifting of the broadcasting start timing required for changing of the broadcasting start timing of the program or for reusing, with simple process by varying the value set in a time object without varying the broadcasting schedule information maps.

Fifthly, in the composite media file broadcasting program broadcasting control system, all broadcasting start timings are expressed along a single time axis and thus makes complicate process, such as tracing of the hierarchy of the broadcasting schedule information maps upon obtaining the time value.

Sixthly, in the composite media file broadcasting program broadcasting control system, an attribute is added to time information managed independently of the broadcasting schedule information map, and classifying unit is provided for classification based on the attribute for simplification of taking out only broadcasting schedule information to be object for working.

Seventhly, the composite media file broadcasting program broadcasting control system enables broadcasting control of the program designated a screen modification timing in various modes by using four kinds of time objects.

Eighthly, the composite media file broadcasting program broadcasting control system can discriminate portions for which broadcasting preparatory process is possible and portions for which broadcasting preparatory process is not possible in one program by using time classification codes, and enables broadcasting preparatory process for the portion other than the portions where the broadcasting preparatory process is not possible, and thus enables instantly broadcasting of next broadcasting data by the broadcasting unit.

Ninthly, in the composite media file broadcasting program broadcasting control system, a schedule control unit is provides a function for outputting data broadcasting schedule information to be broadcasting at timing from order information of the several kinds of time objects to enable broadcasting unit to prepare broadcasting data.

Tenthly, the composite media file broadcasting program broadcasting control system enables broadcasting preparatory process by providing a function for outputting order information of several kinds of time objects for the schedule control unit even in the program where the order of the time objects is undeterminable.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A composite media file broadcasting program broadcasting control method, said method comprising the steps of:
    setting pointer information to broadcasting schedule information map storing broadcasting start timing without setting real time value as broadcasting start timing of a plurality of said broadcasting schedule information map in hierarchy;
    storing time object and attribute information thereof expressing one point on a time axis in the broadcasting schedule information map storing the broadcasting start timing;
    enabling broadcasting preparatory process in a broadcasting unit that performs broadcasting of broadcasting data to a transmission line, even in a condition where broadcasting start timing is not fixed by expressing order of time by time expressing function provided for said time object; and
    performing broadcasting instantly responding to determination of broadcasting start timing during broadcasting,
    wherein, in said time object, context of the time objects on a time axis is expressed by three kinds of times of time fixed type, range designation type and offset designation type and discriminate the time not known the context.

2. A composite media file broadcasting program broadcasting control method as set forth in claim 1, further comprising the steps of:
    setting a time identifier as identification information of the time object in said broadcasting start timing of said broadcasting schedule information; and
    expressing association on a time axis of different broadcasting schedule information maps by using the same time identifier when the same timing is expressed in different broadcasting schedule information map.

3. A composite media file broadcasting program broadcasting control method as set forth in claim 1, which uses kind of unit generated the time object, kind of time object, kind of trigger input device determining a real time value for the time object in range designation, and extending character string as attribute information of the time object registered in the time object map, the method further comprising:
    determining, in association, classifying broadcasting schedule information determining broadcasting schedule information fixing broadcasting start timing in said broadcasting unit, broadcasting schedule information of not fixed time and time; and
    obtaining time list to be determined by a trigger input device that designates modification of broadcasting data of the program on broadcasting to said broadcasting unit, by realizing classification function of the time object by said attribute information.

4. A composite media file broadcasting program broadcasting control method as set forth in claim 1, further comprising:
    realizing lump modification of time information by expressing only pointer information to the time information without presenting real time value in the broadcasting schedule information; and
    facilitating partial reusing of the composite media file broadcasting program based on the realizing of the lump modification of time information.

5. A composite media file broadcasting program broadcasting control method as set forth in claim 1, wherein the time object of time fixed type expresses a time by real time value, said offset designation type time object expresses time with the time identifier of the objective time object and relative time from said time object, and said range designation type time object expresses the time with range start time value or the time identifier of the time object using the range start time value and range end value or the time identifier of the range end time.

6. A composite media file broadcasting program broadcasting control method as set forth in claim 3, wherein as the attribute information of the time object to be registered in the time object map, the method further comprising the step of:
    providing kind of the time object; and
    enabling handing of time objects having different data structure in single time object map with maintaining accessibility of particular kind of time object, based on the providing of the kind of the time object.

* * * * *